United States Patent
Franklin et al.

(10) Patent No.: US 11,893,866 B1
(45) Date of Patent: Feb. 6, 2024

(54) MOBILE APPARATUS WITH WHEEL WEIGHT SENSORS

(71) Applicant: Amazon Technologies, Inc., Seattle, WA (US)

(72) Inventors: Nicholas Franklin, Framingham, MA (US); Andre David Brown, Hopkinton, MA (US)

( * ) Notice: Subject to any disclaimer, the term of this patent is extended or adjusted under 35 U.S.C. 154(b) by 99 days.

(21) Appl. No.: 17/527,654

(22) Filed: Nov. 16, 2021

(51) Int. Cl.
| | |
|---|---|
| G07G 1/00 | (2006.01) |
| G06Q 20/20 | (2012.01) |
| G06Q 20/18 | (2012.01) |
| G07G 1/12 | (2006.01) |
| G01G 19/40 | (2006.01) |

(52) U.S. Cl.
CPC ........... *G07G 1/0054* (2013.01); *G01G 19/40* (2013.01); *G06Q 20/18* (2013.01); *G06Q 20/208* (2013.01); *G07G 1/0072* (2013.01); *G07G 1/0081* (2013.01); *G07G 1/12* (2013.01)

(58) Field of Classification Search
CPC .. G07G 1/0054; G07G 1/0072; G07G 1/0081; G07G 1/12; G01G 19/40; G06Q 20/18; G06Q 20/208
See application file for complete search history.

(56) References Cited

U.S. PATENT DOCUMENTS

| | | | | |
|---|---|---|---|---|
| 5,576,691 A | * | 11/1996 | Coakley | ................ B60B 33/025 340/568.5 |
| 9,117,106 B2 | | 8/2015 | Dedeoglu et al. | |
| 9,235,928 B2 | | 1/2016 | Medioni et al. | |
| 9,473,747 B2 | | 10/2016 | Kobres et al. | |
| 10,266,196 B1 | * | 4/2019 | Sinha | ..................... B62B 3/1416 |
| 11,643,279 B1 | * | 5/2023 | Sekich | ................... B65G 43/08 700/229 |
| 2013/0284806 A1 | | 10/2013 | Margalit | |

(Continued)

FOREIGN PATENT DOCUMENTS

| | | | | |
|---|---|---|---|---|
| EP | 3670293 A1 | * | 6/2020 | ............... B62B 3/14 |
| WO | WO-2006085745 A1 | * | 8/2006 | ......... G01G 19/4144 |

OTHER PUBLICATIONS

Porter, Jon. "This smart shopping cart is a self-service checkout on wheels". Retrieved from <https://www.theverge.com/2019/1/10/18177020/caper-labs-smart-shopping-cart-image-recognition-weight-sensor>. Originally published Jan. 2019. (Year: 2019).*

*Primary Examiner* — Nathan A Mitchell
(74) *Attorney, Agent, or Firm* — Lee & Hayes, P.C.

(57) ABSTRACT

This disclosure describes, in part, wheel apparatuses that includes weight sensors. For instance, a wheel apparatus may include at least a hub, a rim located around the hub, a tire located around the rim, weight sensor(s) located within the rim, and a caster that connects the wheel apparatus to a mobile apparatus. In some examples, the wheel apparatus may include additional components, such as one or more batteries, a generator, and/or a wireless communication interface. As such, the mobile apparatus may use the wheel sensors included in the wheel apparatuses to determine weights, such as weights of items added to the mobile apparatus. In some examples, the wheel apparatuses are configured such that the weight sensors remain perpendicular with respect to a ground plane so that the mobile apparatus may use the weight sensors to determine the weights even when the mobile apparatus is moving.

20 Claims, 12 Drawing Sheets

(56) References Cited

U.S. PATENT DOCUMENTS

| | | | |
|---|---|---|---|
| 2014/0001258 A1* | 1/2014 | Chan | G07G 1/0081 |
| | | | 235/385 |
| 2017/0158215 A1* | 6/2017 | Phillips | B62B 5/0096 |
| 2017/0169440 A1* | 6/2017 | Dey | H04W 4/021 |
| 2019/0154492 A1* | 5/2019 | McNeally | G01G 19/4144 |
| 2020/0275059 A1* | 8/2020 | De Bonet | G06V 20/52 |
| 2021/0335104 A1* | 10/2021 | Karol | H04W 4/80 |
| 2022/0005327 A1* | 1/2022 | Cleper | G06K 7/1413 |
| 2022/0157134 A1* | 5/2022 | Sriraman | G06Q 30/06 |

* cited by examiner

MOBILE APPARATUS WITH WHEEL WEIGHT SENSORS

BACKGROUND

Retail stores maintain an inventory of items in customer-accessible areas such that customers can pick items from the inventory for purchase, rental, and so forth. For example, a customer may take items from shelves located within the store and place the items in a shopping cart. When the customer is finished identifying and retrieving the items, the customer may transport the items, using the shopping cart, to a check-out destination within the store, such as a cashier or dedicated self-checkout stand. In some circumstances, the shopping cart may include sensors, such as cameras and scanners, that are configured to determine the items that are placed into the shopping cart by the customer. In these circumstances, the shopping cart may then update a list of items for the customer, display the list of items to the customer, and/or send the list of items to a system for processing of a transaction for the items.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
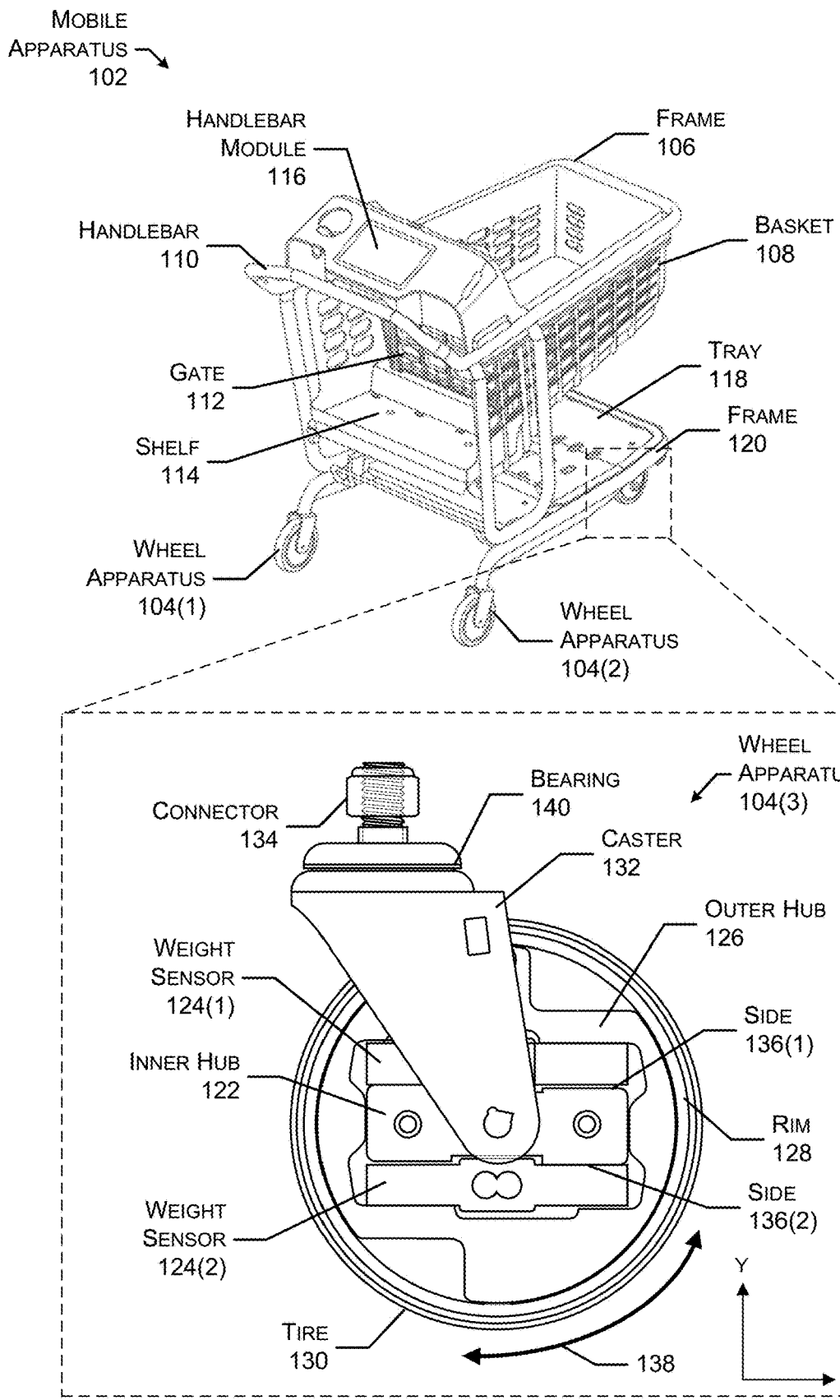
FIG. 1 illustrates an example of a mobile apparatus that includes wheels with weight sensors, in accordance with examples of the present disclosure.

This disclosure describes, in part, mobile apparatuses that include wheels with weight sensors. For instance, a mobile apparatus, such as a shopping cart, may include at least a main frame, a basket that attaches to the main frame, a wheel frame that attaches to the main frame, a tray disposed on the wheel frame, and wheel apparatuses that attach to the wheel frame. Each wheel apparatus may include at least a respective caster and wheel, where the wheel includes at least a hub (e.g., axle), circular component(s) (e.g., a rim, a tire, etc.) disposed around the hub, and weight sensor(s) disposed within the circular component. In some examples, each wheel apparatus may include multiple weight sensors, such as two loadcells, that are coupled to the hub disposed within the circular component. The mobile apparatus may then receive sensor data generated by the weight sensors within the wheel apparatuses. Using the sensor data, the mobile apparatus may determine weights associated with the mobile apparatus and use the weights to determine a weight of an item added to the mobile apparatus (e.g., placed within the basket, placed within a shelf, and/or placed on the tray of the mobile apparatus). For example, the mobile apparatus may determine that the weight of the item includes a change in weight that occurs based on the item being added to the mobile apparatus. The mobile apparatus may then generate item data that represents at least an identifier of the item, the weight of the item, the price of the item (which may be based on the weight), and/or any other information about the item.

For more detail, the mobile apparatus may include a frame (referred to, in some examples, as the "main frame" or an "upper frame") that includes, or supports, components of the mobile apparatus. For example, the main frame may include, and/or support, a basket. The basket may include a bottom having a given shape (e.g., a quadrilateral shape, a circular shape, a triangular shape, etc.), sides (e.g., three sides and a gate, four sides, etc.) protruding from the bottom to define a receptacle, and a top having a perimeter that defines an opening of the receptacle to receive items that are placed within the basket. Additionally, the main frame may include, and/or support, a handlebar module. The handlebar module may include one or more sensors (e.g., camera(s), scanner(s), proximity sensor(s), motion sensor(s), etc.), one or more lights, a display, one or more processors, one or more memories, and/or any other type of electronic component. In some examples, the handlebar module may be configured to perform the processes described herein.

The main frame of the mobile apparatus may be connected to another frame (referred to, in some examples, as the "wheel frame" or a "lower frame") that includes components for providing mobility to the mobile apparatus. In some examples, the wheel frame may further include, and/or support, a tray. The tray may also include any shape (e.g., a quadrilateral shape, a circular shape, a triangular shape, etc.), where tray is also for receiving items. Additionally, the wheel frame may support wheel apparatuses to enable movement of the mobile apparatus along a surface.

Each wheel apparatus may include at least a respective caster, weight sensor(s), and a wheel, where the wheel includes at least a hub (e.g., axle) and circular component(s) (e.g., a rim, a tire, etc.) disposed around the hub. In some examples, and for a given wheel apparatus, the weight sensor(s) may be disposed within the wheel of the wheel apparatus. For a first example, a wheel may include the weight sensor(s) coupled to the hub, where the circular component(s) are then disposed around the hub. For a second example, and if a wheel includes an inner hub and an outer hub, the wheel may include the outer hub disposed around the inner hub, the weight sensor(s) disposed between the inner hub and the outer hub, and the circular component(s) disposed around the outer hub. Still, for a third example, the weight sensor(s) of the wheel may operate as the axle of the wheel, wherein the circular component(s) are then disposed around the axle. While these are just a couple of examples of how the weight sensors may be located within the wheels of the wheel apparatuses, in other examples, the weight sensors may be located at additional and/or alternative locations within the wheels.

Additionally, or alternatively, in some examples, the weight sensors may be located at other locations of the wheel apparatuses. For a first example, a wheel apparatus may include weight sensor(s) that attach the wheel to the caster (e.g., the weight sensor(s) may attach the axle of the wheel to the caster). For a second example, a wheel apparatus may include a weight sensor that is located between the caster and the wheel, such as proximate to a bearing of the caster. Still, for a third example, a wheel apparatus may include weight sensor(s) attached to the caster, where the weight sensor(s) are then used to connect the wheel apparatus to the wheel frame. For instance, the weight sensor(s) may operate as the components (e.g., fastener(s)) of the caster that attach the wheel apparatus to the wheel frame. Each of these wheel apparatuses are discussed in more detail below.

In some examples, the weight sensors (e.g., the loadcells) are disposed within the wheel apparatuses such that the weight sensors remain perpendicular to a ground plane. In other words, the weight sensors are disposed within the wheel apparatuses such that the weight sensors do not rotate with other components of the wheel apparatuses, such as the circular components, which rotate as the mobile apparatus is in motion. This way, the weight sensors are able to continually determine the weights associated with the mobile apparatus when the mobile apparatus is both stationary and in motion. In such examples, to cause the weight sensors to remain perpendicular with respect to the ground plane, the weight sensors are coupled to other components of the wheel apparatuses that are also configured not to rotate when the mobile apparatus is in motion. For example, the weight sensors may be coupled to hubs, casters, fasteners, and/or any other components that do not rotate with the circular components when the mobile apparatus are in motion.

In some examples, each wheel apparatus may include one or more additional and/or alternative components. For a first example, a wheel apparatus may include one or more removable and/or rechargeable batteries. In such an example, if the one or more batteries are rechargeable, then the wheel apparatus may further include a generator to recharge the one or more batteries, such as when the mobile apparatus is in motion. For a second example, a wheel apparatus may include a communication interface to send data to one or more devices, such as to the handlebar module described below. In such an example, the communication interface may include a physical communication interface (e.g., wires) that the wheel apparatus uses to communicate with the handlebar module and/or the communication interface may include a wireless communication interface that the wheel apparatus uses to communicate with the handlebar module via a wireless network.

As described above, the mobile apparatus may include the handlebar module that is configured to identify items added to the mobile apparatus, determine weights of the items, determine prices of the items, provide information about the items to a user, and/or perform one or more additional and/or alternative processes. To determine the weights, the handlebar module is configured to receive sensor data generated by the weight sensors located within the wheel apparatuses. As described above, in some examples, the handlebar module receives the sensor data using wire connections between the handlebar module and the weight sensors. In other examples, the handlebar module receives the sensor data using wireless connections with the weight sensors. In either of the examples, the handlebar module may then determine weights (referred to, in some examples, as "apparatus weights") associated with the mobile apparatus.

In some examples, the handlebar module may determine an apparatus weight by analyzing the sensor data in order to determine respective weights measured by each of the weight sensors. The handlebar module may then determine the apparatus weight associated with the mobile apparatus as the total of each of the measured weights. For example, if first sensor data generated by a first weight sensor of a first wheel apparatus represents a first weight of ten pounds, second sensor data generated by a second weight sensor of a second wheel apparatus represents a second weight of fifteen pounds, third sensor data generated by a third weight sensor of a third wheel apparatus represents a third weight of twenty pounds, and fourth sensor data generated by a fourth sensor of a fourth wheel apparatus represents a fourth weight of thirty pounds, then the handlebar module may determine a total apparatus weight of seventy-five pounds.

Additionally, or alternatively, in some examples, the handlebar module may receive combined sensor data from the weight sensors. The handlebar module may then analyze the sensor data to determine the apparatus weight associated with the mobile apparatus. For example, if the combined sensor data represents a weight of seventy-five pounds, then the handlebar module may determine a total apparatus weight of seventy-five pounds. While these are just a couple example techniques of how the handlebar module may use the sensor data to determine apparatus weights, in other examples, the handlebar module may use additional and/or alternative techniques.

The handlebar module may then use the apparatus weights in order to determine weights (referred to, in some examples, as "item weights") for items added to the mobile apparatus. For example, the handlebar module may determine that an item has been placed within the basket of the mobile apparatus. In some examples, the handlebar module makes the determination based on the apparatus weights changing from a first apparatus weight to a second, greater apparatus weight over a period of time. In some examples, the handlebar module makes the determination using other types of sensor data. For example, the handlebar module may receive sensor data generated by other sensor(s), such as camera(s), scanner(s), and/or the like. The handlebar module may then analyze the sensor data to determine that the sensor data represents the item and/or represents an identifier of the item. As described herein, the identifier may include a code (e.g., a barcode, a Quick Response (QR) code, etc.), a label (e.g., a name, a brand, etc.), a logo, and/or any other type of identifier that may be placed on an item. Based on determining that the sensor data represents the item and/or the identifier, the handlebar module may determine that the item was placed within the basket.

Still, in some examples, the handlebar module makes the determination based on receiving an input. For example, if the user is placing an item within the basket that is priced per unit weight, the handlebar module may receive an input from the user, where the input indicates that the user is placing the item within the basket. Based on receiving the input, the handlebar module may determine that the item was placed within the basket. In such an example, the input may be associated with the user adding an item to the mobile apparatus that is priced per unit weight. In other words, this example describes a manual process that may be performed when determining the weight of an item, while the previous examples describe processes that are automatically performed by the handlebar module.

In either of the examples above, the handlebar module may determine the item weight associated with the item based on a first apparatus weight determined at a first time, which is before the item was placed within the basket, and a second apparatus weight determined at a second time, which is after the item was placed within the basket. For instance, the handlebar module may determine the item weight by taking a difference between the second apparatus weight determined at the second time and the first apparatus weight determined at the first time. For example, if the second apparatus weight is one hundred pounds and the first apparatus weight is seventy-five pounds, then the handlebar module may determine that the item weight is twenty-five pounds.

In some examples, the handlebar module may then use the item weight to perform one or more additional processes. For a first example, the handlebar module may include the item weight as part of cart data associated with the item. For a second examples, the handlebar module may use the item weight to determine a price of the item. For instance, if the item is priced per unit weight, the handlebar module may determine the price using the item weight and the price per unit weight. Still, for a third example, the handlebar module may use the item weight to identify the item placed within the basket and/or to verify the identity of the item. For instance, the handlebar module may receive and/or store data representing weights associated with various items. The handlebar module may then identify the item and/or verify the identity of the item by matching the item weight to a weight associated with the item. When performing such processes, the handlebar module may use the location of the mobile apparatus within a facility to narrow the items down to a subset of items associated with the location. Additionally, when performing such processes, the handlebar module may receive the data from one or more computing devices, where the data represents the weights of items that have recently been interacted with within the facility (e.g., items recently removed from inventory locations).

In the examples described herein, the components of the wheel apparatuses may include any type of material. For example, the components may include, but are not limited to, plastic, wood, metal, composites, rubber, or any other material and/or combinations of materials. Additionally, the weight sensors described herein may include any type of sensor that is capable to determining weights of objects. For example, a weight sensor may include, but is not limited to, strain gauge loadcell, a capacitive loadcell, a hydraulic loadcell, a pneumatic loadcell, a piezoelectric transducer, and/or any other type of sensor that is capable to measuring weight of objects.

While the examples above describe the mobile apparatus as including a shopping cart with at least a main frame, a lower frame, a basket, a tray, and a handlebar module, in other examples, the mobile apparatus may include any type of apparatus that includes at least a frame, a compartment, and at least one wheel apparatus. In such examples, the compartment may be for placing objects, such as user(s) and/or item(s). This way, the mobile apparatus is able to use the weight sensor(s) associated with the wheel apparatus(es) to determine the weights of the objects that are placed on the compartment.

By configuring the mobile apparatus to include wheel apparatuses that include weight sensor(s), the mobile apparatus is able to determine the apparatus weights associated with the mobile apparatus and then use the apparatus weights in order to determine the item weights of items added to the mobile apparatus and/or removed from the mobile apparatus. Additionally, since the only contact between the mobile apparatus and the ground may be through the wheel apparatuses, such as during normal operation of the mobile apparatus, the mobile apparatus may be able to determine weights that are more accurate than the mobile apparatus would determine using weight sensor(s) located at other locations. This is because all of the weight from items added to the mobile apparatus will be measured by the weight sensors of the wheel apparatuses, since the weight sensors are measuring the total weight of the mobile apparatus with the items.

FIG. 1 illustrates an example of a mobile apparatus 102 that includes wheel apparatuses 104(1)-( ) (also referred to as "wheel apparatuses 104") with weight sensors, in accordance with examples of the present disclosure. As shown, the mobile apparatus 102 may include a main frame 106. In the example of FIG. 1, the main frame 106 may include at least a top portion, side portions, a front portion, and a bottom portion that is located underneath a basket 108 of the mobile apparatus 102. The top portion of the main frame 106 may include a handlebar 110 that a user uses to push the mobile apparatus 102. The main frame 106 may be made of plastic, wood, metal, composites, or any other material and/or combinations of materials. As shown, the main frame 106 may include, and/or support, the other components of the mobile apparatus 102.

For example, the main frame 106 (e.g., the bottom portion of the main frame 106) may support the basket 108. The basket 108 may comprise a bottom having a given shape (e.g., a quadrilateral shape, a circular shape, a triangular shape, etc.), sides protruding from the bottom, and a gate 112. The sides and the gate 112 define a receptacle, where a top of the basket 108 includes a perimeter that defines an opening of the receptacle to receive items that are placed within the basket 108. Additionally, in the example of FIG. 1, the mobile apparatus 102 may include a shelf 114 that extends substantially horizontally from the basket 108. As shown, the shelf 114 also includes a bottom and sides protruding from the bottom, where the sides and the bottom define a receptacle of the tray 114 that is also for receiving items.

The mobile apparatus 102 may further include a handlebar module 116 that is coupled to the main frame 106. The handlebar module 116 may include one or more sensors (e.g., camera(s), scanner(s), proximity sensor(s), motion sensor(s), etc.), one or more lights, a display, and/or any other type of electronic device. As described in more detail within, the handlebar module 116 may perform one or more of the processes described herein with respect to identifying items added to the mobile apparatus 102 (e.g., items placed within the basket 108, within the shelf 114, on a tray 118, etc.), determining weights associated with the items, providing information associated with the items, and/or to perform any other process described herein.

The main frame 106 of the mobile apparatus 102 may be connected to a wheel frame 120 that includes components for providing mobility to the mobile apparatus 102. For instance, the wheel frame 120 may support the wheel apparatuses 104 that the mobile apparatus 102 uses for mobility. While the example of FIG. 1 only illustrates three of the wheel apparatuses 104 of the mobile apparatus 102, the mobile apparatus 102 of FIG. 1 includes a total of four wheel apparatuses 104. Additionally, while the example of FIG. 1 illustrates the mobile apparatus 102 that includes fourth wheel apparatuses 104, in other examples, a mobile apparatus may include any number of wheel apparatuses, such as one wheel apparatus, two wheel apparatuses, three wheel apparatuses, ten wheel apparatuses, and/or the like, and still perform the processes described herein.

As shown by the bottom illustration of the wheel apparatus 104(3), each wheel apparatus 104 may include at least an inner hub 122, weight sensors 124(1)-(2) (also referred to as "weight sensors 124"), an outer hub 126, a rim 128, and a tire 130. The example of FIG. 1 further illustrates that the wheel apparatus 104 is attached to the wheel frame 120 using at least a caster 132 and a connector 134. While the example of FIG. 1 only illustrates the wheel apparatus 104 as including the inner hub 122, the weight sensors 124, the outer hub 126, the rim 128, the tire 130, the caster 132, and the connector 134, in other examples, the wheel apparatus 104 may include additional and/or alternative components. Such examples of components for wheel apparatuses are further illustrated in the examples of FIGS. 2-7.

As shown, the wheel apparatus 104 is configured such that the weight sensors 124 are coupled to the inner hub 122 of the wheel apparatus 104. In some examples, the weight sensors 124 are coupled to the inner hub 122 in order to prevent the weight sensors 124 from rotating when the mobile apparatus 102 is in motion (e.g., the inner hub 122 may not rotate with the rim 128 and the tire 130 when the mobile apparatus 102 is in motion). This may ensure that the weight sensors 124 remain perpendicular to the ground plane, which may be represented by the x-direction, even when the mobile apparatus 102 is in motion. By ensuring that the weight sensors 124 remain perpendicular to the ground plane even when the mobile apparatus 102 is in motion, the mobile apparatus 102 is capable of determining weights using the weight sensors 124 both while the mobile apparatus 102 is stationary and while the mobile apparatus 102 is in motion.

In the example of FIG. 1, the wheel apparatus 104 includes the first weight sensor 124(1) coupled to a first side 136(1) (e.g., a top side) of the inner hub 122 and the second weight sensor 124(2) coupled to a second side 136(2) (e.g., a bottom side) of the inner hub 122. However, in other examples, the weight sensors 124 disposed within the wheel apparatus 104 may be located at additional and/or alternative location(s) within the wheel apparatus 104. In some examples, each weight sensor 124 may measure the total weight that is applied to the wheel apparatus 104 of the mobile apparatus 102. However, in other examples, each weight sensor 124 may measure only a portion of the total weight that is applied to the wheel apparatus 104 of the mobile apparatus 104. For example, the first weight sensor 124(1) may measure a first portion of the total weight while the second weight sensor 124(2) measures a second portion of the total weight, where the first portion of the total weight and the second portion of the total weight together equal the total weight that is applied to wheel apparatus 104.

Figure 3:
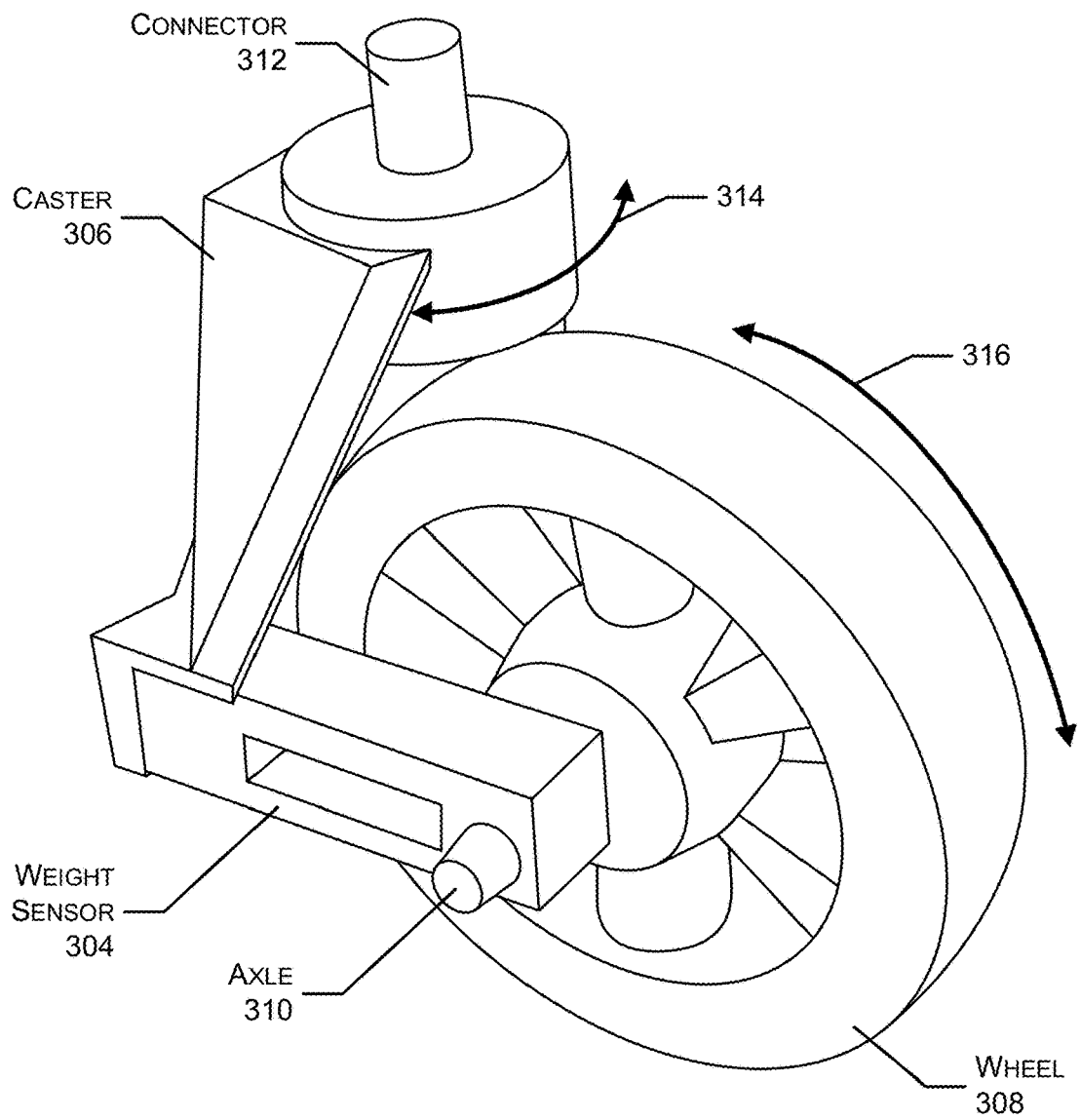
FIG. 3 illustrates an example of a second wheel apparatus that includes a weight sensor, in accordance with examples of the present disclosure.

As shown, the wheel apparatus 104 also includes the outer hub 126 disposed around the inner hub 122 and the weight sensors 124. The rim 128 is then disposed around the outer hub 126 such that the rim 128 is able to rotate with respect to the outer hub 126 when the mobile apparatus 102 is in motion (which is represented by an arrow 138). Additionally, the tire 130 is then disposed around the rim 128. As such, and in the example of FIG. 1, the rim 128 and the tire 130 may rotate around the z-direction when the mobile apparatus 102 is in motion (which is illustrated in the example of FIG. 3), while the rest of the components of the wheel apparatus 104 do not rotate around the z-direction with the rim 128 and the wheel 130.

As will be described in more detail below, the weight sensors 124 of the wheel apparatus 104 may communicate with the component(s) of the handlebar module 116 using one or more techniques. For a first example, the weight sensors 124 of the wheel apparatus 104 may include wired connections with the component(s) of the handlebar module 116, where the weight sensors 124 send sensor data to the component(s) via the wired connections. In such examples, the casters 132 may be configured such that the casters 132 are restricted from fully rotating around the y-direction (which is also illustrated in the example of FIG. 3). For instance, the casters 132 may be restricted such that the casters 132 rotate less than 360 degrees in the y-direction in order to protect the wired connections. For a second example, the wheel apparatuses 104 may include wireless interfaces, where the wheel apparatuses 104 are then able to send sensor data to the component(s) via a wireless network. In such examples, the casters 132 may be configured to fully rotate around the y-direction, such as 360 degrees.

In the example of FIG. 1, the connectors 134 include bolts and screws that couple the wheel apparatuses 104 to the wheel frame 120. However, in other examples, the connectors 134 may include other types of connectors that are capable to coupling the wheel apparatuses 104 to the wheel frame 120. For example, the connectors 134 may include, but are not limited to, Velcro, tape, glue, magnets, and/or any other type of connectors that are capable of connecting the wheel apparatuses 104 to the wheel frame 120. Additionally, in some examples, the connectors 134 may be configured such that the wheel apparatuses 104 are able to attach to other types of mobile apparatuses. This way, if a mobile apparatus currently includes wheels without sensors, the wheels of the mobile apparatus may be replaced by the wheel apparatuses 104 (and/or one or more of the other wheel apparatuses described herein).

As illustrated in the example of FIG. 1, the wheel apparatus 104(3) (and/or similarly the other front wheel apparatus that is not labeled) may include a bearing 140 that allows the wheel apparatus 140(3) to rotate. However, the wheel apparatus 104(1) and/or the wheel apparatus 104(2) may not include a bearing for rotation. This is because the wheel apparatus 104(3) and the other front wheel apparatus may be used to steer the mobile apparatus 102, such as by turning the front of the mobile apparatus 102. However, in other examples, each of the wheel apparatuses 104 may include a bearing and/or each of the wheel apparatuses 104 may not include a bearing.

Figure 2:
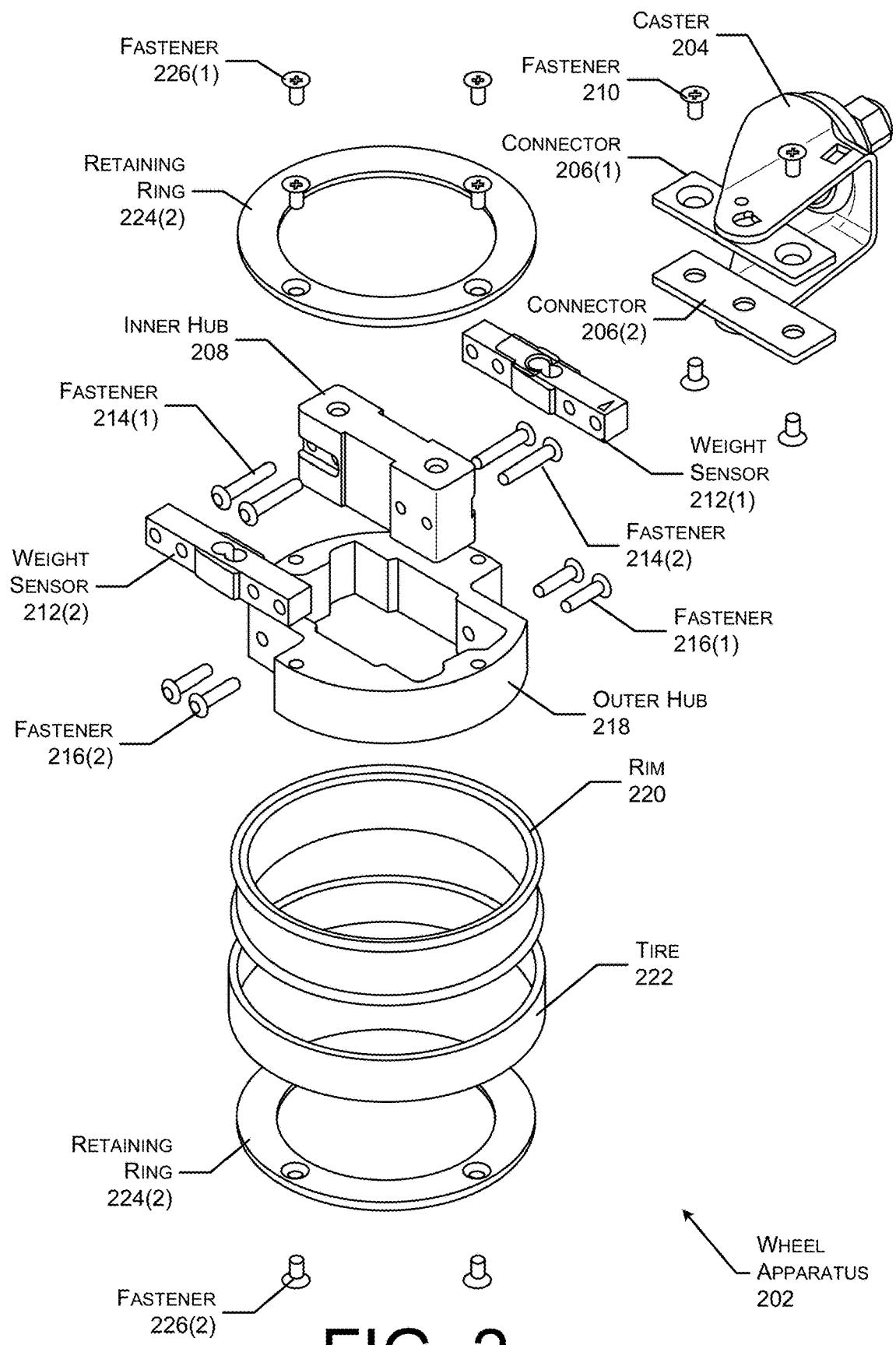
FIG. 2 illustrates an example of a first wheel apparatus that includes a weight sensor, in accordance with examples of the present disclosure.

FIG. 2 illustrates an example of a first wheel apparatus 202 that includes a weight sensor, in accordance with examples of the present disclosure. In some examples, the wheel apparatus 202 may include, and/or be similar to, the wheel apparatuses 104. As shown, the wheel apparatus 202 may include a caster 204 that attaches to connectors 206(1)-(2) (also referred to as "connectors 206"). In some examples, the caster 204 attaches to the connectors 206 using a rigid type of connection, such as by welding the connectors 206 to the caster 204. However, in other examples, the caster 204 may be attached to the connectors 206 using any other type of connection (e.g., bolts, screws, adhesive, etc.). By attaching the connectors 206 to the caster 204 using rigid connections, the connectors 206 will not rotate with respect to the caster 204 when a mobile apparatus 202 is in motion.

An inner hub 208 may then attach to the caster 204 using the connectors 206. For instance, and as illustrated in the example of FIG. 2, the inner hub 208 may attach to the connectors 206 using multiple fasteners 210, such as four fasteners 210 (although only one is labeled for clarity reasons). As described herein, a fastener may include, but is not limited to, a screw, a bolt, a pin, and/or any other type fastener that is able to attach two components together. In some examples, and by using multiple fasteners 210, the connection between the inner hub 208 and the connectors 206 are also rigid such that the inner hub 208 is also unable to rotate with respect to the caster 204 when a mobile apparatus is in motion.

The wheel apparatus 202 further comprises weight sensors 212(1)-(2) (also referred to as "weight sensors 212") that attach to the inner hub 208. In the example of FIG. 2, the weight sensors 212 include a first weight sensor 212(1) attached to a first side of the inner hub 208 and a second weight sensor 212(2) attached to a second side of the inner hub 208. However, in other examples, the wheel apparatus 202 may include any number of weight sensors 212 (e.g., one weight sensor, three weight sensors, ten weight sensors, etc.) that attach to any location on the inner hub 208. Additionally, in the example of FIG. 2, the first weight sensor 212(1) attaches to the inner hub 208 using fasteners 214(1) (although only one is labeled for clarity reasons) and fasteners 216(1) (although only one is labeled for clarity reasons) and the second weight sensor 212(2) attaches to the inner hub 208 using fasteners 214(2) (although only one is labeled for clarity reasons) and fasteners 216(2) (although only one is labeled for clarity reasons). While the example of FIG. 2 illustrates attaching each weight sensor 212 using four fasteners 214, 216, in other examples, each weight sensor 212 may be attached using any number of fasteners.

The wheel apparatus 202 further comprises an outer hub 218 that attaches to the inner hub 208 using the fasteners 216. In the example of FIG. 2, when the outer hub 218 is attached to the inner hub 208, the weight sensors 212 may be located between the inner hub 208 and the outer hub 218, similar to the wheel apparatuses 104 illustrated in the example of FIG. 1. By configuring the wheel apparatus 202 as shown, the connectors 206, the inner hub 208, and the outer hub 218 include rigid connection with respect to the caster 204. In other words, the connectors 206, the inner hub 208, and the outer hub 218 do not rotate with respect to the caster 204 when the mobile apparatus is in motion. This way, the orientations of the weight sensors 212 will be maintained such that the weight sensors 212 remain perpendicular to a ground plane. As described herein, by keeping the orientations of the weight sensors 212 such that the weight sensors 212 remain perpendicular to the ground plane, a mobile apparatus is able to determine weights even when the mobile apparatus is in motion.

As further illustrated in the example of FIG. 2, the wheel apparatus 202 may include a rim 220 that is disposed around the outer hub 218 and a tire 222 that is disposed around the rim 220. Additionally, in order to secure the rim 220 around the outer hub 218, the wheel apparatus 202 may include retaining rings 224(1)-(2) (also referred to as "retaining rings 224") that attach to each side of the rim 220 and the outer hub 218. For example, the first retaining ring 224(1) may attach to a first side of the outer hub 218 using fasteners 226(1) (although only one is labeled for clarify reasons) and the second retaining ring 224(2) may attach to a second side of the outer hub 218 using fasteners 226(2) (although only one is again labeled for clarity reasons). In the example of FIG. 2, the retaining rings 224 are configured such that the retaining rings 224 overlap a portion of the rim 220 when the retaining rings 224 are attached to the outer hub 218, which secures the rim 220 to the outer hub 218. While the example of FIG. 2 illustrates using four fasteners 226(1) and/or four fasteners 216(2), in other examples, the wheel apparatus 202 may include any number of fasteners to attach the retaining rings 224 to the outer hub 218.

While the example of FIG. 2 illustrates each of the components as being separate from one another, in other examples, one or more of the components may be combined into a single component. For a first example, the inner hub 208 may be manufactured in order to include the weight sensors 212 such that the weight sensors 212 are not separate from the inner hub 208. For a second example, the rim 220 may be manufactured such that the rim 220 includes the retaining rings 224.

In the example of FIG. 2, as well as the examples of FIGS. 3-7, the components of the wheel apparatus 202 may include any type of material. For example, the components may include, but are not limited to, plastic, wood, metal, composites, rubber, or any other material and/or combinations of materials. Additionally, the weight sensors 212, as well as other weight sensors described herein, may include any type of sensor that is capable to determining weights of objects. For example, a weight sensor may include, but is not limited to, strain gauge loadcell, a capacitive loadcell, a hydraulic loadcell, a pneumatic loadcell, a piezoelectric transducer, and/or any other type of sensor that is capable to measuring weight of objects.

FIG. 3 illustrates an example of a second wheel apparatus 302 that includes weight sensors 304, in accordance with examples of the present disclosure. As shown, the wheel apparatus 302 includes a caster 306, a wheel 308 with an axle 310, the weight sensor 304, and another weight sensor (not show) located on the other side of the wheel 308. In the example of FIG. 3, a first portion of the weight sensor 304 attaches to the axle 310 while a second portion of the weight sensor 304 attaches to the caster 306. This way, the weight of the caster 306 as well as the weight that is applied to the caster 306 from other objects is measured by the weight sensors 304. However, the weight of the wheel 308 may not be measured by the weight sensors 304. For example, if the wheel apparatus 302 is attached to a mobile apparatus with other, similar wheel apparatus(es), the weight sensors 304 of the wheel apparatuses will measure the weight of the mobile apparatus (except for the weight of the wheels 308) along with the weights of any objects (e.g., items) added to the mobile apparatus.

In the example of FIG. 3, the wheel apparatus 302 may be configured to connect to a mobile apparatus using a connector 312. The connector 312 may be configured to allow the caster 306 to rotate, which is represented by an arrow 314), such as while the mobile apparatus is in motion in order to turn the mobile apparatus. For a first example, if the weight sensors 304 include wired connections with other component(s), the caster 310 may be configured to rotate, but less than 360 degrees, in order to protect the wired connections. For a second example, if the weight sensors 304 include wireless connections with other component(s), the caster 310 may be configured to rotate 360 degrees. In either of the examples, the weight sensors 304 and the axle 308 may be configured to also rotate along with the caster 310.

Additionally, in the example of FIG. 3, the wheel apparatus 302 is configured such that the wheel 308 rotates around the axle 310, which is represented by an arrow 316. However, based on how the weight sensors 304 are connected to the axle 310 and the caster 306, the weight sensors 304 are configured to not rotate with the wheel 308. This way, the weight sensors 304 will remain perpendicular with respect to the ground plane even when a mobile apparatus with the wheel apparatus 302 is in motion.

Figure 4:
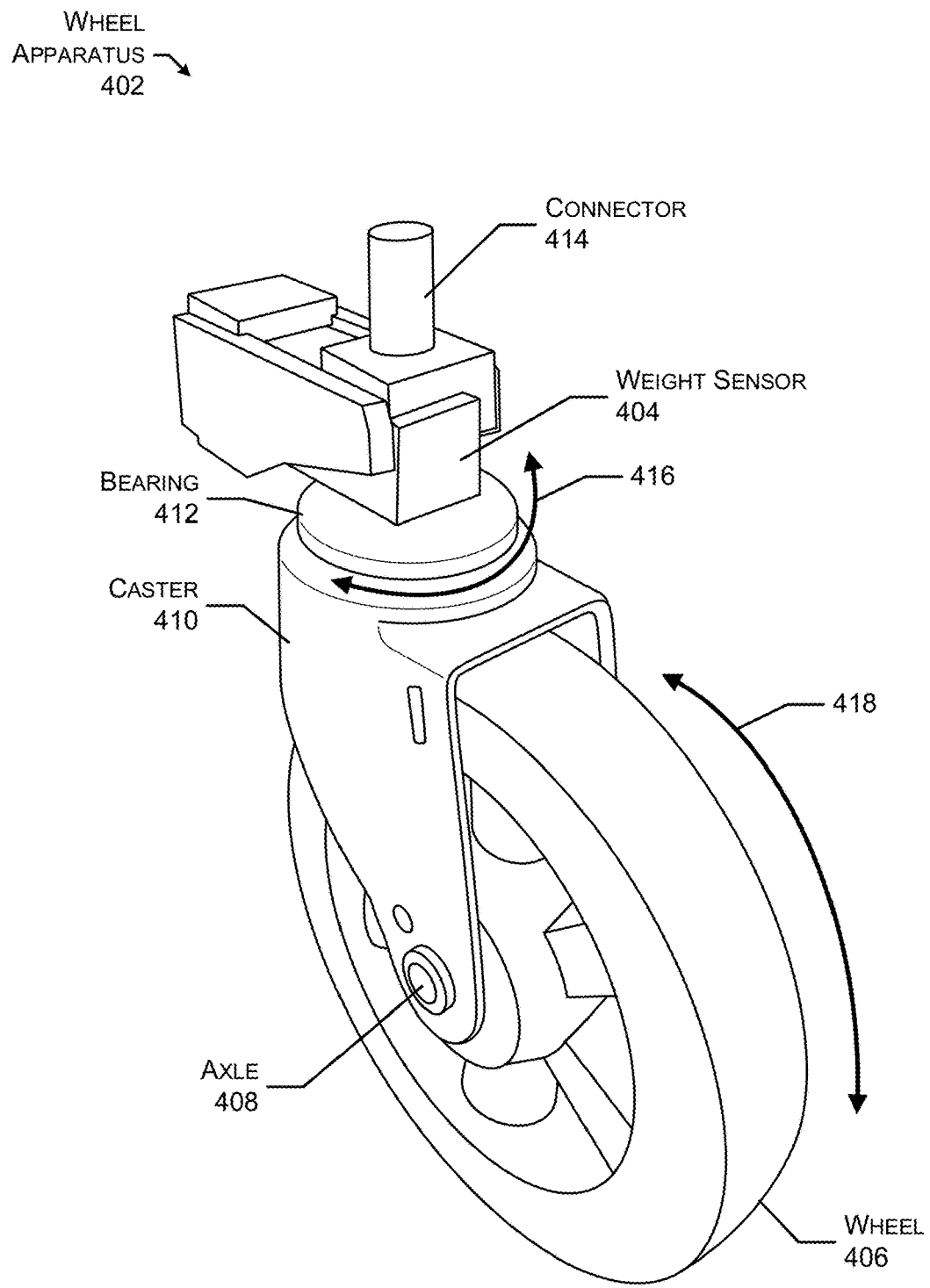
FIG. 4 illustrates an example of a third wheel apparatus that includes a weight sensor, in accordance with examples of the present disclosure.

FIG. 4 illustrates an example of a third wheel apparatus 402 that includes a weight sensor 404, in accordance with examples of the present disclosure. As shown, the wheel apparatus 402 includes a wheel 406, an axle 408, a caster 410, a bearing 412, a connector 414, and the weight sensors 404. In the example of FIG. 4, a first portion of the weight sensor 404 is disposed above the bearing 412 while a second portion of the weight sensor 404 attaches to the connector 414. This way, the weight of the connector 414 as well as the weight that is applied to the connector 414 from other objects is measured by the weight sensor 404. However, the weight of the wheel 406, the weight of the caster 410, and the weight of the bearing 412 may not be measured by the weight sensor 404. For example, if the wheel apparatus 402 is attached to a mobile apparatus with other, similar wheel apparatus(es), the weight sensors 404 of the wheel apparatuses will measure the weight of the mobile apparatus (except for the weight of the wheels 406, the casters 410, and the bearings 412) along with the weights of any objects (e.g., items) added to the mobile apparatus.

In the example of FIG. 4, the connector 414 of the wheel apparatus 302 is coupled to a wheel frame of a mobile apparatus such that the weight sensor 404, the bearing 412, the caster 410, and the wheel 406 are able to rotate, which is represented by an arrow 416). For a first example, if the weight sensor 404 include wired connections with other component(s), the weight sensor 404, the bearing 412, the caster 410, and the wheel 406 may be configured to rotate, but less than 360 degrees, in order to protect the wired connections. For a second example, if the weight sensor 404 include wireless connections with other component(s), the weight sensor 404, the bearing 412, the caster 410, and the wheel 406 may be configured to rotate 360 degrees.

Additionally, in the example of FIG. 4, the wheel apparatus 402 is configured such that the wheel 406 rotates around the axle 408, which is represented by an arrow 418. However, based on how the weight sensor 404 is disposed above the caster 410, the weight sensor 404 is configured to not rotate with the wheel 418. This way, the weight sensor 404 will remain perpendicular with respect to the ground plane even when a mobile apparatus with the wheel apparatus 402 is in motion.

Figure 5:
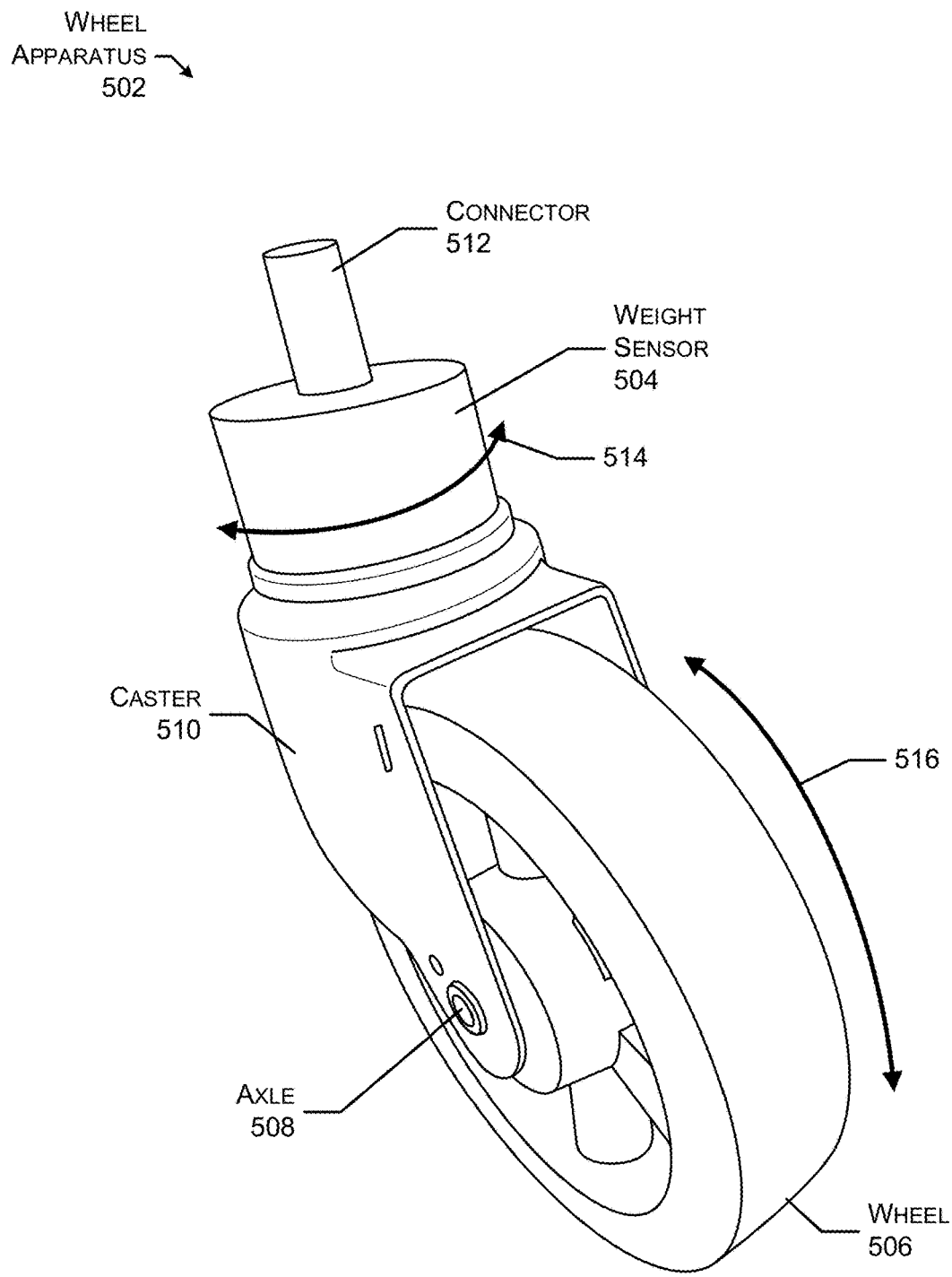
FIG. 5 illustrates an example a fourth wheel apparatus that includes a weight sensor, in accordance with examples of the present disclosure.

FIG. 5 illustrates an example of a fourth wheel apparatus 502 that includes a weight sensor 504, in accordance with examples of the present disclosure. As shown, the wheel apparatus 502 includes a wheel 506, an axle 508, a caster 510, and the weight sensors 504. In the example of FIG. 5, the weight sensor 504 is attached to the caster 510, such as by using a secure connection (e.g., welding). Additionally, a top portion of the weight sensor 504 may operate as a connector 512 for connecting the wheel assembly 502 to a mobile apparatus. This way, the weight sensor 504 may not measure the weight of the caster 510 and/or the wheel 506. Rather, the weight sensor 504 will measure the weight of the mobile apparatus along with any objects (e.g., items) added to the mobile apparatus. For example, if the wheel apparatus 502 is attached to a mobile apparatus with other, similar wheel apparatus(es), the weight sensors 504 of the wheel apparatuses will measure the weight of the mobile apparatus along with the weights of any objects (e.g., items) added to the mobile apparatus.

As discussed above, in the example of FIG. 5, the connector 512 of the weight sensor 504 is coupled to a wheel frame of a mobile apparatus such that the weight sensor 504, the caster 510, and the wheel 506 are able to rotate, which is illustrated by an arrow 514). For a first example, if the weight sensor 504 include wired connections with other component(s), the weight sensor 504, the caster 510, and the wheel 506 may be configured to rotate, but less than 360 degrees, in order to protect the wired connections. For a second example, if the weight sensor 504 includes wireless connections with other component(s), the weight sensor 504, the caster 510, and the wheel 506 may be configured to rotate 360 degrees.

Additionally, in the example of FIG. 5, the wheel apparatus 502 is configured such that the wheel 506 rotates around the axle 508, which is represented by an arrow 516. However, based on how the weight sensor 504 is disposed above the caster 410, the weight sensor 514 is configured to not rotate with the wheel 506. This way, the weight sensor 504 will remain perpendicular with respect to the ground plane even when a mobile apparatus with the wheel apparatus 502 is in motion.

Figure 6:
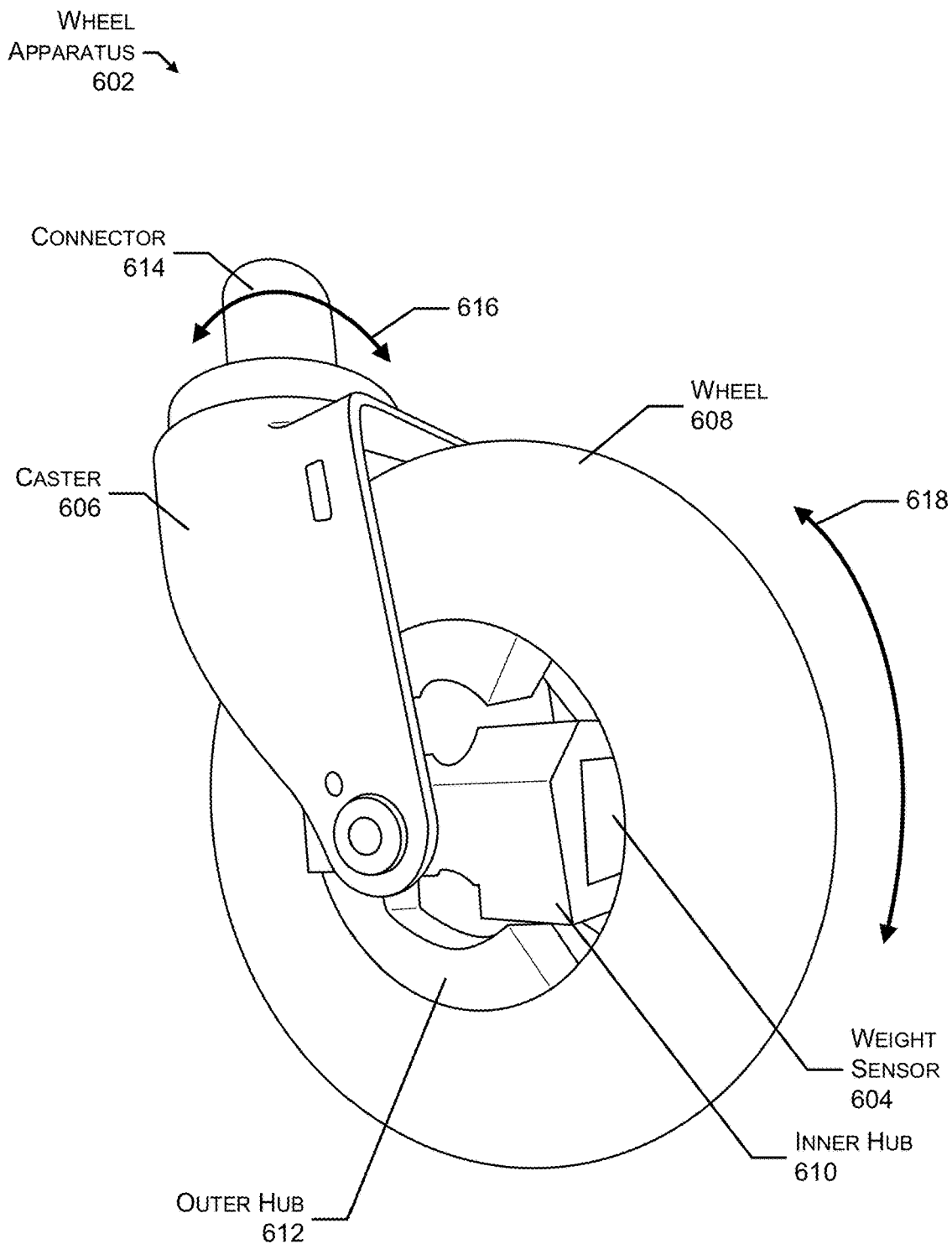
FIG. 6 illustrates an example of a fifth wheel apparatus that includes a weight sensor, in accordance with examples of the present disclosure.

FIG. 6 illustrates an example of a fifth wheel apparatus 602 that includes a weight sensor 604, in accordance with examples of the present disclosure. As shown, the wheel apparatus 602 includes a caster 606 and a wheel 608, where the wheel 608 includes an inner hub 610, an outer hub 612, and the weight sensor 604. In the example of FIG. 6, the wheel apparatus 602 may include a similar structure as the wheel apparatus 202. For example, the inner hub 610 and the outer hub 612 may operate similarly to the inner hub 208 and the outer hub 218, respectively. However, the wheel apparatus 602 includes only a single weight sensor 604 that is located within the inner hub 610. In other words, the inner hub 610 of the wheel apparatus 602 may operate as the weight sensor 604.

In the example of FIG. 6, the caster 606 includes a connector 614 that connectors the wheel apparatus 602 to a wheel frame of a mobile apparatus. As such, the caster 606 and the wheel 608 are able to rotate using the connection, which is represented by an arrow 616). For a first example, if the weight sensor 604 include wired connections with other component(s), the weight sensor 064, the caster 606, and the wheel 608 may be configured to rotate, but less than 360 degrees, in order to protect the wired connections. For a second example, if the weight sensor 604 includes wireless connections with other component(s), the weight sensor 604, the caster 606, and the wheel 608 may be configured to rotate 360 degrees.

Additionally, in the example of FIG. 6, the wheel apparatus 602 is configured such that the wheel 608 rotates around the inner hub 610 and the outer hub 612, which is represented by an arrow 618. However, based on how the weight sensor 604 is disposed within the inner hub 610, the weight sensor 604 is configured to not rotate with the wheel 608. This way, the weight sensor 604 will remain perpendicular with respect to the ground plane even when a mobile apparatus with the wheel apparatus 602 is in motion.

Figure 7:
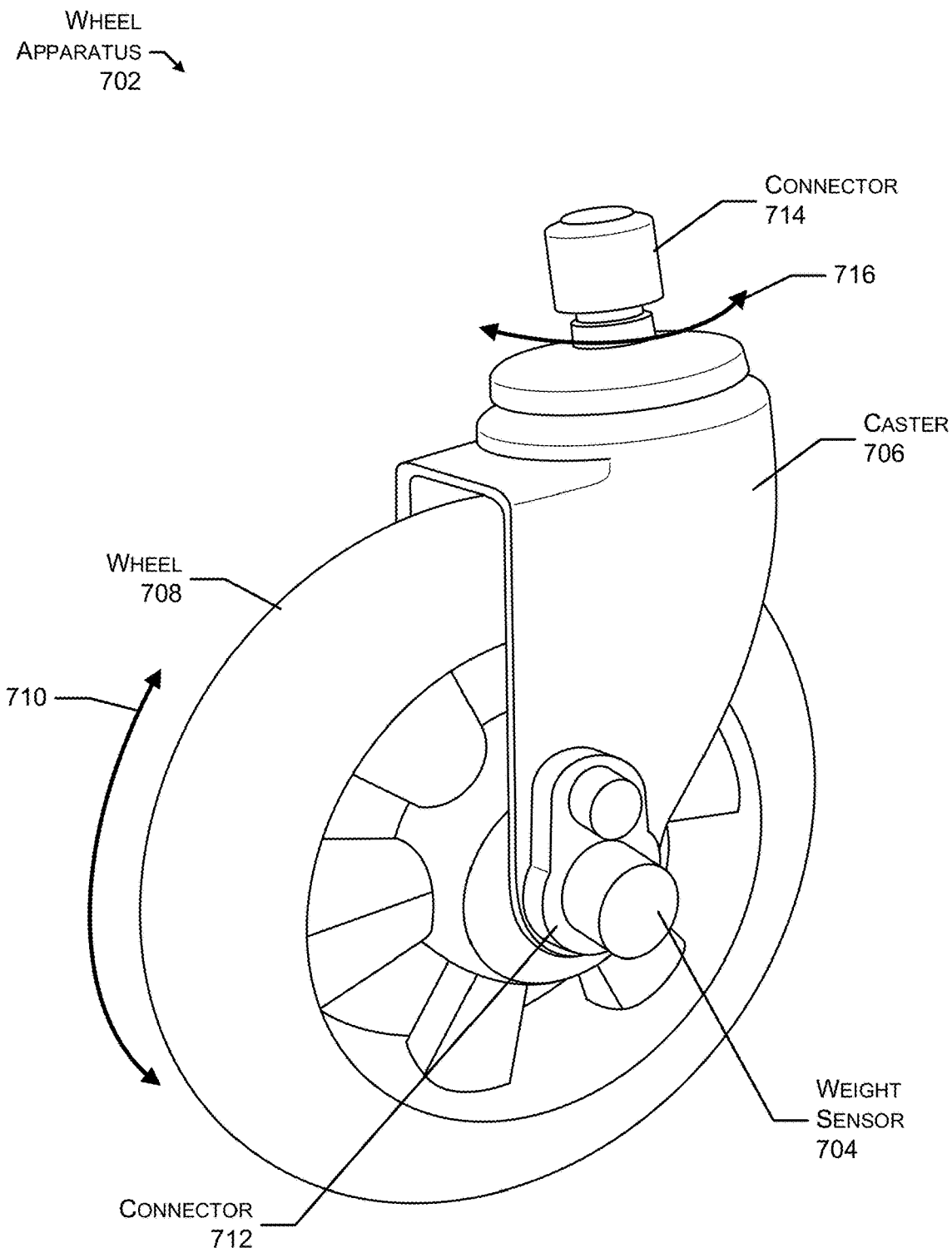
FIG. 7 illustrates an example of a sixth wheel apparatus that includes a weight sensor, in accordance with examples of the present disclosure.

FIG. 7 illustrates an example of a sixth wheel apparatus 702 that includes a weight sensor 704, in accordance with examples of the present disclosure. As shown, the wheel apparatus 702 includes a caster 706 and a wheel 708. In the example of FIG. 7, the weight sensor 704 may operate as the axle to the wheel 708. For example, the weight sensor 704 may include a cylindrical shape such that the wheel 708 is able to rotate around the weight sensor 704, which is illustrated by 710. In some examples, connectors 712 (although only one is illustrated for clarity reasons) are then configured to attach each side of the weight sensor 704 to the caster 706. By using such a weight sensor 704, the weight sensor 704 may not measure the weight of the wheel 708. Rather, the weight sensor 704 will measure the weight of the caster 706, the weight of the mobile apparatus, and the weights of any objects (e.g., items) added to the mobile apparatus. For example, if the wheel apparatus 702 is attached to a mobile apparatus with other, similar wheel apparatus(es), the weight sensors 704 of the wheel apparatuses will measure the weight of the casters 706, the weight of the mobile apparatus, and the weights of any objects (e.g., items) added to the mobile apparatus.

In the example of FIG. 7, the caster 706 may include a connector 714 that attaches the wheel apparatus 702 to a wheel frame of a mobile apparatus. Based on the connection, the caster 706 and the wheel 708 are able to rotate, which is represented by an arrow 716. For a first example, if the weight sensor 704 includes wired connections with other component(s), the caster 706 and the wheel 708 may be configured to rotate, but less than 360 degrees, in order to protect the wired connections. For a second example, if the weight sensor 704 includes wireless connections with other component(s), the caster 706 and the wheel 708 may be configured to rotate 360 degrees.

Figure 8:
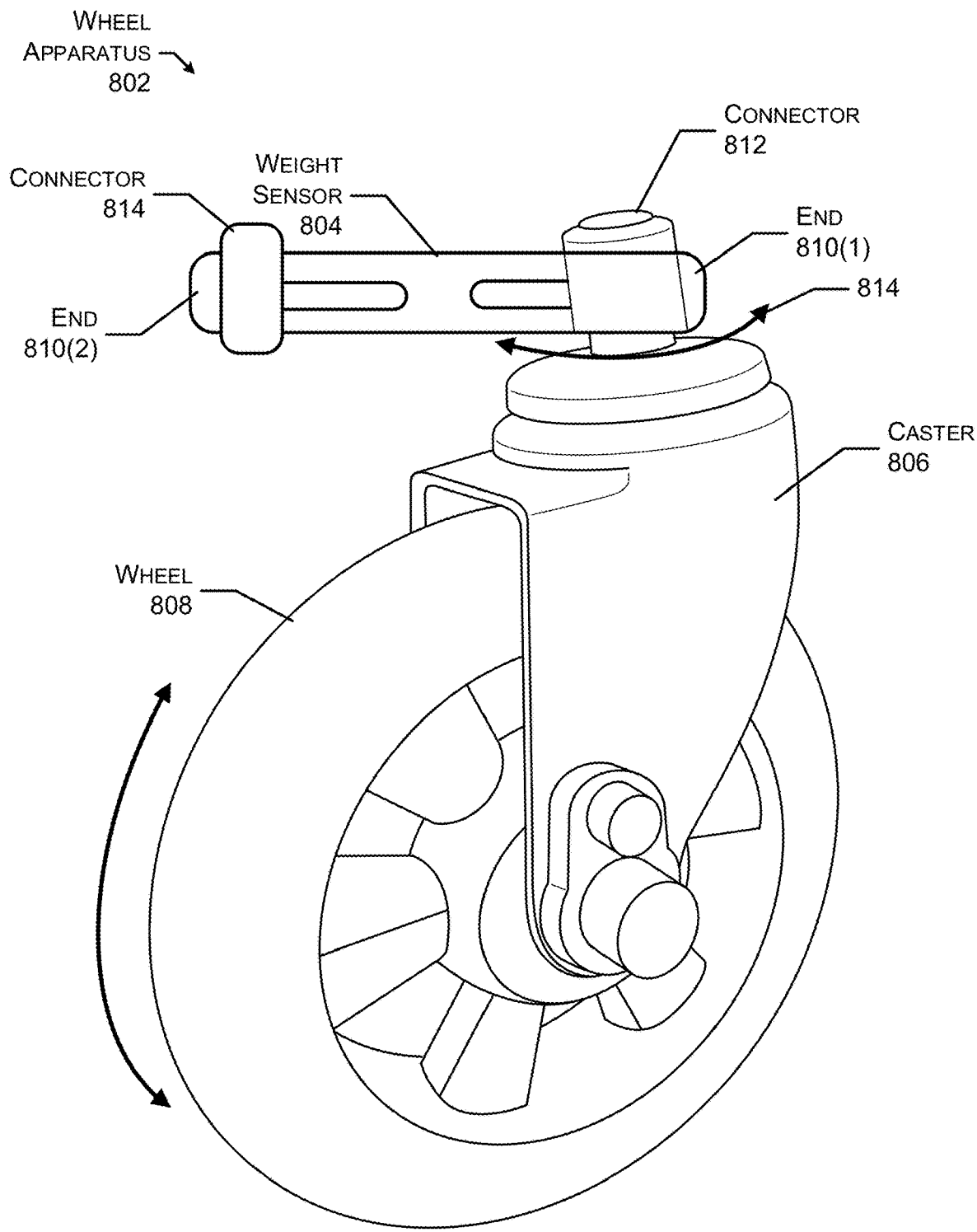
FIG. 8 illustrates an example of an seventh wheel apparatus that includes a weight sensor, in accordance with examples of the present disclosure.

FIG. 8 illustrates an example of a seventh wheel apparatus 802 that includes a weight sensor 804, in accordance with examples of the present disclosure. As shown, the wheel apparatus 802 includes a caster 806 and a wheel 808. In the example of FIG. 8, the weight sensor 804 may include a component that attaches the wheel apparatus 802 to a frame of a mobile apparatus. For example, a first end 810(1) of the weight sensor 804 may be configured to attach to a connector 812 associated with the caster 806 while a second end 810(2) of the weight sensor 804 is configured to attach to the frame of the mobile apparatus, such as by using a second connector 814. In the example of FIG. 8, the caster 806 and the wheel 808 are able to rotate, which is represented by an arrow 814.

Figure 9:
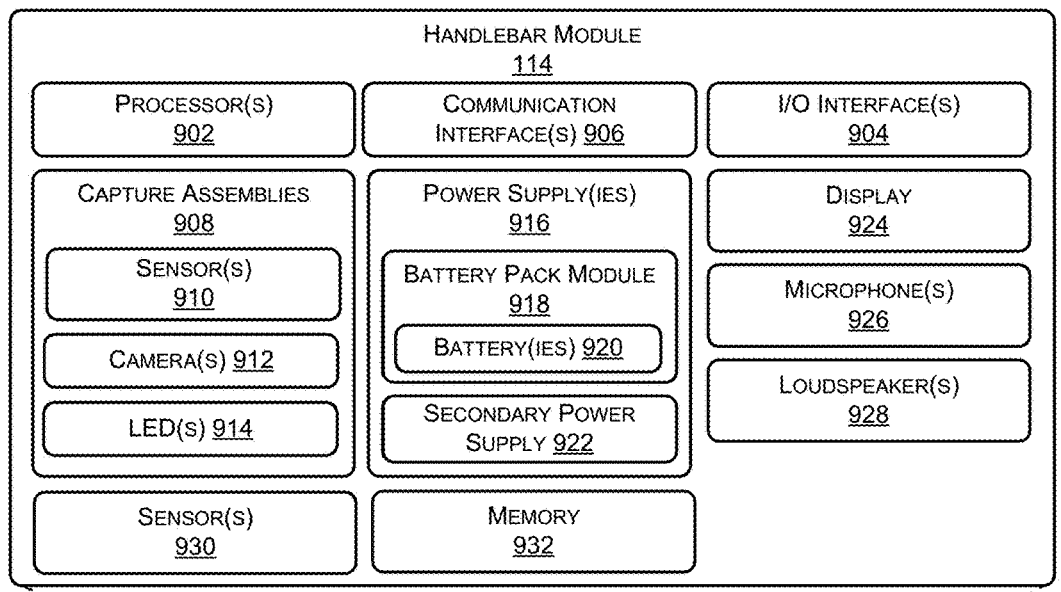
FIG. 9 illustrates an example of components of a handlebar module, in accordance with examples of the present disclosure.
Figure 9:
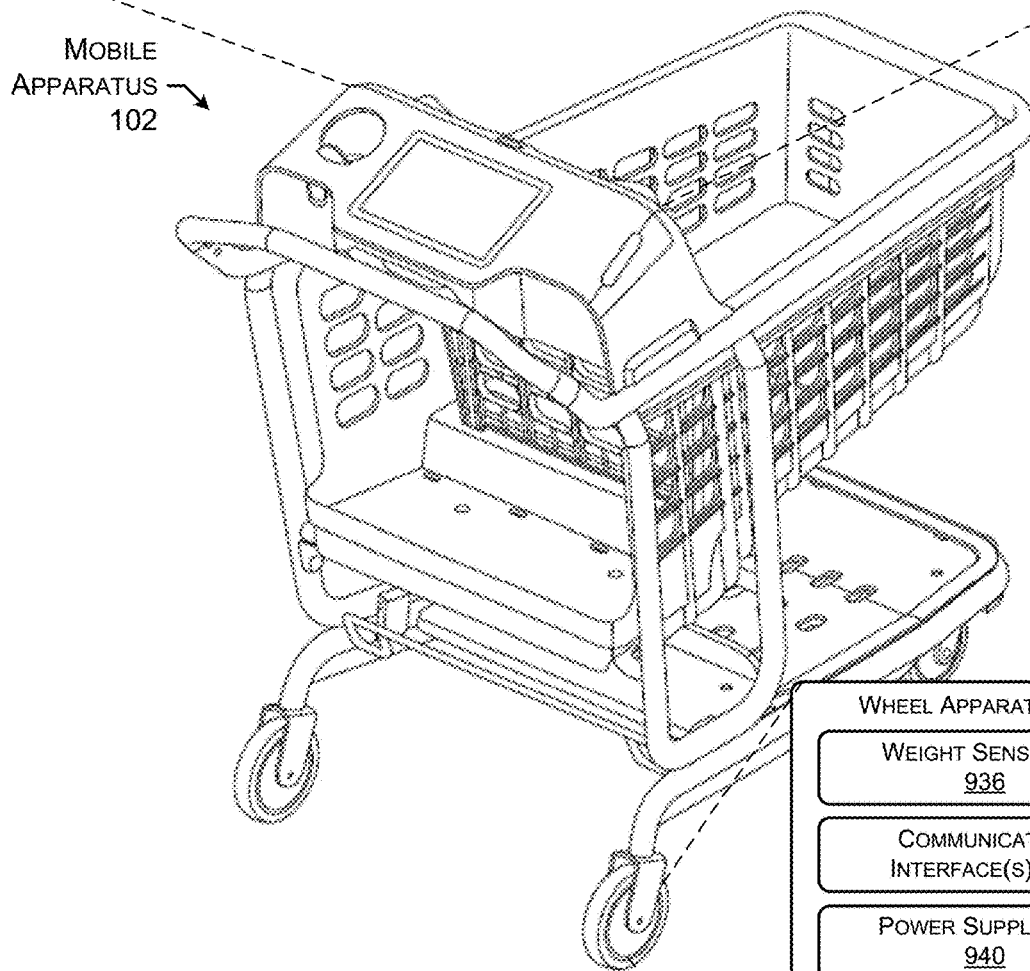
Figure 9:
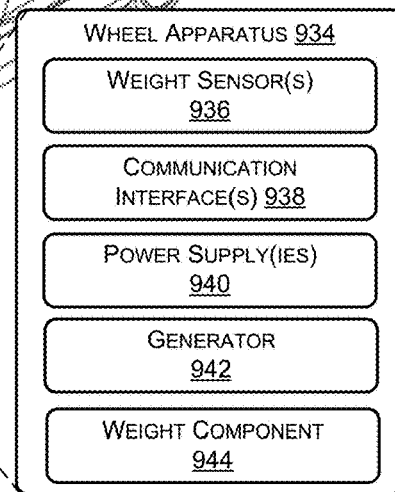

FIG. 9 illustrates example components of the handlebar module 116 configured to support at least a portion of the functionality of an item management system. The handlebar module 116 may include one or more hardware processors 902 (processors) configured to execute one or more stored instructions. The processor(s) 902 may comprise one or more cores. The handlebar module 116 may include one or more input/output (I/O) interface(s) 904 to allow the processor(s) 902 or other portions of the handlebar module 116 to communicate with other devices. The I/O interface(s) 904 may comprise Inter-Integrated Circuit (I2C), Serial Peripheral Interface bus (SPI), Universal Serial Bus (USB) as promulgated by the USB Implementers Forum, and so forth. The I/O interface(s) 904 may allow the various modules/components to communicate with each other and/or control each other.

The handlebar module 116 may also include one or more communication interfaces 906. The communication interface(s) 906 are configured to provide communications between the handlebar module 116 and other devices, such as the server(s), sensors, interface devices, routers, and so forth. The communication interface(s) 906 may include devices configured to couple to personal area networks (PANs), wired and wireless local area networks (LANs), wired and wireless wide area networks (WANs), and so forth. For example, the communication interfaces 906 may include devices compatible with Ethernet, Wi-Fi™, and so forth. The handlebar module 116 may also include one or more busses or other internal communications hardware or software that allow for the transfer of data between the various modules and components of the handlebar module 116.

The handlebar module 116 may also include the one or more capture assemblies 908 that each include one or more sensors 910, a camera 912, and one or more LEDs 914. In some examples, the sensor(s) 910 may comprise any type of sensor that is able to detect the presence of nearby objects without the need for physical contact (e.g., ToF sensor(s), PIR sensor(s), capacitive sensor(s), etc.). The cameras 912 in each of the capture assemblies 908 may comprise any type of camera or imaging device configured to generate image data (and/or video data), or information descriptive of a plurality of picture elements or pixels. The LED(s) 914 may be selectively activated to emit light at any wavelength, visible or non-visible to users. In some examples, one or more capture assemblies 908 may additionally, or alternatively, be facing downward into the basket 108 of the handlebar module 116. Additionally, the handlebar module 116 may include one or more cameras 912 that are outward facing in that generate image data representing the facility around the handlebar module 116.

The handlebar module 116 may include one or more power supply(ies) 916 to provide power to the components of the handlebar module 116, such as a battery pack module 919, which include one or more batteries 920. The power supply(ies) 916 may also include a secondary (e.g., internal) power supply 922 to allow for hot swapping of battery pack modules 919, such as one or more capacitors, internal batteries, etc.

The handlebar module 116 may also include the display 924 configured to display content represented by image data, such as pictures, videos, user interface elements, and/or any other image data. The display 924 may comprise any type of display 924, and may further be a touch screen to receive touch input from a user. The handlebar module 116 may also include one or more microphones 926 and one or more loudspeakers 928 to facilitate a dialogue with a user, and/or to receive feedback from the user. The microphone(s) 926 may capture sound representing the user's speech, and the loudspeaker(s) 928 may output machine-generated words to facilitate a dialogue, prompt a user for feedback on an item and/or for other information, and/or output other alerts or notifications.

The handlebar module 116 may also include other types of sensor(s) 930. As described herein, these sensor(s) 930 may include proximity sensor(s), light sensor(s), and/or the like.

The handlebar module 116 may include one or more memories 932 (e.g., in an electronics box module along with the processor(s) 902). The memory 932 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 932 provides storage of computer-readable instructions, data structures, program modules, and other data for the operation of the handlebar module 116. Examples of operations that may be performed by the handlebar module 116 are described with respect to FIG. 9.

As further illustrated by the example of FIG. 9, a wheel apparatus 934 (and similarly each of the other wheel apparatuses) of the mobile apparatus 102 may include weight sensor(s) 936, communication interface(s) 939, one or more power supplies 940, and a generator 942. In some examples, the wheel apparatus 934 may represent, and/or include, one or more of the wheel apparatuses 202, 302, 402, 502, 602, or 702. The communication interface(s) 938 are configured to provide communications between the wheel apparatus 934 and other devices, such as the server(s), sensors, interface devices, routers, the handlebar module 116, and so forth. The communication interface(s) 938 may include devices configured to couple to personal area networks (PANs), wired and wireless local area networks (LANs), wired and wireless wide area networks (WANs), and so forth. For example, the communication interface(s) 938 may include devices compatible with Ethernet, Wi-Fi™, and so forth.

The one or more power supplies 940 may provide power to the components of the wheel apparatus 934. In some examples, the one or more power supplies 940 may include a battery pack module and/or one or more batteries. In some examples, the one or more power supplies 940 may be replaceable while in some examples, the one or more power supplies 940 may additionally, or alternatively, be rechargeable. For example, the generator 942 may be configured to recharge the one or more power supplies 940, such as when the mobile apparatus 102 is in motion and the wheel is rotating. In other words, the generator 942 may use the rotation of the wheel in order to recharge the one or more power supplies 940.

As further illustrated in the example of FIG. 9, the wheel apparatus 934 may include a weight component 944. As described herein, in some examples, the weight component 944 may be configured to receive the sensor data generated by the weight sensor(s) 936 and determine a weight using the sensor data. In such examples, the wheel apparatus 934 may then send, to the handlebar module 114, data representing the weight in addition to, or alternatively from, sending the actual sensor data. Additionally, in examples where the wheel apparatus 934 includes the weight component 944, the weight component 944 may represent processor(s), memory, and/or instructions stored in the memory to perform these processes.

Figure 10:
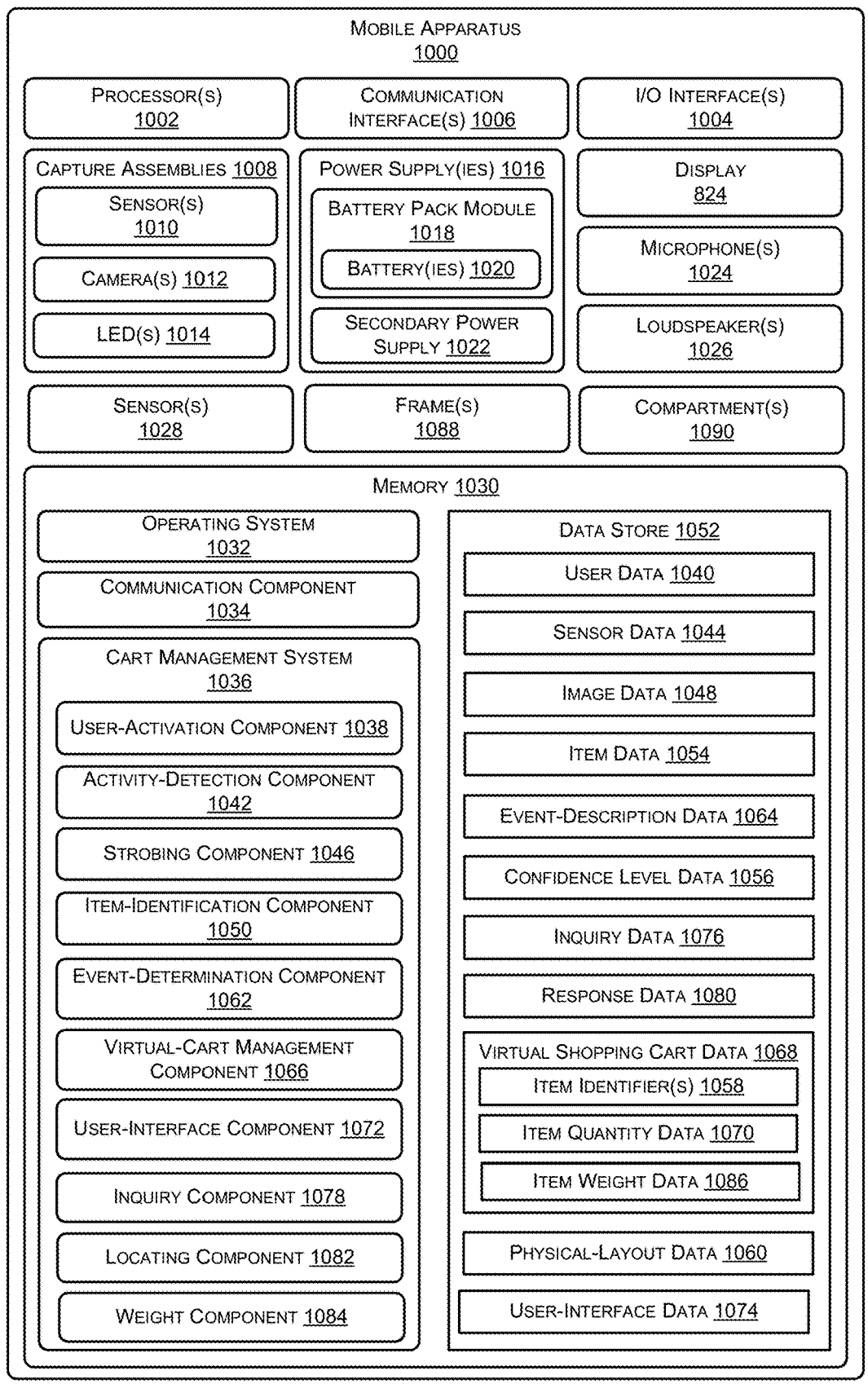
FIG. 10 illustrates example components of a mobile apparatus configured to support at least a portion of functionality of an item management system, in accordance with examples of the present disclosure.

FIG. 10 illustrates example components of the mobile apparatus 1000 (which may represent, and/or include, the mobile apparatus 102) configured to support at least a portion of the functionality of an item management system. The mobile apparatus 1000 may include one or more hardware processors 1002 (processors) (which may represent, and/or include, the processor(s) 802) configured to execute one or more stored instructions. The processor(s) 1002 may comprise one or more cores. The mobile apparatus 1000 may include one or more I/O interface(s) 1004 (which may represent, and/or include, the I/O interface(s) 804) to allow the processor(s) 1002 or other portions of the mobile apparatus 1000 to communicate with other devices. The I/O interface(s) 1004 may comprise Inter-Integrated Circuit (I2C), Serial Peripheral Interface bus (SPI), Universal Serial Bus (USB) as promulgated by the USB Implementers Forum, and so forth. The I/O interface(s) 1004 may allow the various modules/components to communicate with each other and/or control each other.

The mobile apparatus 1000 may also include one or more communication interfaces 1006 (which may represent, and/or include, the communication interface(s) 806). The communication interface(s) 1006 are configured to provide communications between the mobile apparatus 1000 and other devices, such as the server(s), sensors, interface devices, routers, and so forth. The communication interface(s) 1006 may include devices configured to couple to personal area networks (PANs), wired and wireless local area networks (LANs), wired and wireless wide area networks (WANs), and so forth. For example, the communication interfaces 1006 may include devices compatible with Ethernet, Wi-Fi™, and so forth. The mobile apparatus 1000 may also include one or more busses or other internal communications hardware or software that allow for the transfer of data between the various modules and components of the mobile apparatus 1000.

The mobile apparatus 1000 may also include the one or more capture assemblies 1008 (which may represent, and/or include, the one or more capture assemblies 808) that each include one or more sensors 1010, a camera 1012, and one or more LEDs 1014. In some examples, the sensor(s) 1010 may comprise any type of sensor that is able to detect the presence of nearby objects without the need for physical contact (e.g., ToF sensor(s), PIR sensor(s), capacitive sensor(s), etc.). The cameras 1012 in each of the capture assemblies 1008 may comprise any type of camera or imaging device configured to generate image data (and/or video data), or information descriptive of a plurality of picture elements or pixels. The LED(s) 1014 may be selectively activated to emit light at any wavelength, visible or non-visible to users. In some examples, one or more capture assemblies 1008 may additionally, or alternatively, be facing downward into the basket 108 of the mobile apparatus 1000. Additionally, the mobile apparatus 1000 may include one or more cameras 1012 that are outward facing that generate image data representing the facility around the mobile apparatus 1000.

The mobile apparatus 1000 may include one or more power supply(ies) 1016 (which may represent, and/or include, the one or more power supplies 816) to provide power to the components of the mobile apparatus 1000, such as a battery pack module 1018, which include one or more batteries 1020. The power supply(ies) 1016 may also include a secondary (e.g., internal) power supply 1020 to allow for hot swapping of battery pack modules 1018, such as one or more capacitors, internal batteries, etc.

The mobile apparatus 1000 may also include the display 824 configured to display content represented by image data, such as pictures, videos, user interface elements, and/or any other image data. The display 824 may comprise any type of display 824, and may further be a touch screen to receive touch input from a user. The mobile apparatus 1000 may also include one or more microphones 1024 (which may represent, and/or include, the microphone(s) 824) and one or more loudspeakers 1026 (which may represent, and/or include, the loudspeaker(s) 828) to facilitate a dialogue with a user, and/or to receive feedback from the user. The microphone(s) 1024 may capture sound representing the user's speech, and the loudspeaker(s) 1026 may output machine-generated words to facilitate a dialogue, prompt a user for feedback on an item and/or for other information, and/or output other alerts or notifications.

The mobile apparatus 1000 may also include other types of sensor(s) 1028 (which may represent, and/or include, the sensor(s) 830). As described herein, these sensor(s) 1028 may include weight sensor(s) with loadcell(s), where, in some examples, the loadcell(s) are located between the wheels of the mobile apparatus 1000.

The mobile apparatus 1000 may include one or more memories 1030 (which may represent, and/or include, the memory 832). The memory 1030 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 1030 provides storage of computer-readable instructions, data structures, program modules, and other data for the operation of the mobile apparatus 1000. A few example functional modules are shown stored in the memory 1030, although the same functionality may alternatively be implemented in hardware, firmware, or as a system on a chip (SOC).

The memory 1030 may include at least one operating system (OS) component 1032. The OS component 1032 is configured to manage hardware resource devices such as the I/O interface(s) 1004, the communication interface(s) 1006, and provide various services to applications or components executing on the processor(s) 1002. The OS component 1032 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 1030. These components may be executed as foreground applications, background tasks, daemons, and so forth. A communication component 1034 may be configured to establish communications with one or more of the sensors, one or more of the servers, or other devices. The communications may be authenticated, encrypted, and so forth.

The memory 1030 may further store a cart management system 1036. The cart management system 1036 is configured to provide the item-identifying functions (and other functions) provided by the mobile apparatus 1000 as described herein. For example, the cart management system 1036 may be configured to detect items, identify items, and maintain a virtual shopping cart for a user of the mobile apparatus 1000.

The cart management system 1036 may include a user-activation component 1038 that performs operations for activating a shopping session using the mobile apparatus 1000 on behalf of a user. For instance, a user may have previously registered for a user account with an operator of the facility to utilize various automated management services provided by an operator of the facility. The user may have registered for a user account, such as by providing user data 1040, to automate payments made for items taken by the user and included a payment means (e.g., credit card, bank account number, etc.), and may have also provided an identification means in the user data 1040 to the user-activation component 1038 such that the mobile apparatus 1000 can recognize the user. For instance, the user may have registered to identify themselves to the mobile apparatus 1000 using any identification technique by the user-activation component 1038, such as by providing the user data 1040 by presenting an identification means to a camera/scanner 1012 (e.g., presenting a driver's license, presenting a facility-issued card, presenting a user identifier via a mobile phone, etc.), and/or speaking a predefined utterance that is captured by the microphone(s) 1024 (e.g., a name of the user, a predefined keyword, etc.). Once a user has identified themselves using the user-activation component 1038, the user-activation component 1038 may open a shopping session where the mobile apparatus 1000 identifies and track items retrieved by the user and placed in the mobile apparatus 1000.

The cart management system 1036 may additionally include an activity-detection component 1042 configured to detect items (or objects) within a particular proximity to the mobile apparatus 1000. For example, the capacitive sensor(s) 1028 may generate sensor data 1044. The activity-detection component 1042 may then analyze the sensor data 1044 in order to determine a capacitance detected by the capacitive sensor(s) 1028. Additionally, the activity-detection component 1042 may use the capacitance to perform one or more of the processes described herein to detect the presence of a user. For example, the activity-detection component 1042 may use the capacitance to determine if the user is located proximate to the mobile apparatus 1000, the user is located over the perimeter of the mobile apparatus 1000, determine if the user is located within the opening of the mobile apparatus 1000, determine if the user is in contact with the cart, and/or the like.

The cart management system 1036 may further include a strobing component 1046 configured to cause the LED(s) 1014 and/or shutters of the camera(s) 1012 to strobe according to different frequencies. As noted above, the LED(s) 1014 may emit light in any light spectrum (e.g., infrared, near infrared, visible, etc.). However, some items may have text and/or other marking printed thereon using dye-based color inks that have diminished and/or similar near infrared (NIR) absorbance. This may lead to compromised contrast between, and essentially "washing out" of many distinct features in the visible spectrum when viewed in NIR. Accordingly, in some examples it may be advantageous to cause the LED(s) 1014 to emit light in the visible spectrum. When generating image data 1048 using camera(s) 1012, motion blur may appear when capturing fast moving objects. However, the motion blur may be reduced or eliminated by exposing the camera(s) 1012 imager for a short (e.g., sub-millisecond) durations. Accordingly, the strobing component 1046 may strobe the opening and closing of shutters of the camera(s) 1012 to limit the sensor exposure duration. Additionally, the strobing component 1046 may cause the LEDs 1014 to emit/strobe light at a particular frequency.

The cart management system 1036 may also include an item-identification component 1050 configured to analyze image data 1048 to identify an item represented in the image data 1048. The image data 1048 may comprise information descriptive of a plurality of picture elements, or pixels, for one or more image frames (e.g., a still picture, multiple picture frames, video frames, etc.). The item-identification component 1050 may analyze the image data 1048 using various image processing techniques, or computer vision techniques. For instance, the item-identification component 1050 may extract a representation of an item depicted in the image data 1048 generated by at least one of the camera(s) 1012. The representation may include identifying text printed on the item, colors or color schemes printed on the item, 2-D and/or 3D shapes of the item, and/or other techniques for extract a representation of the item. In some instances, the representation of the item depicted in the image data 1048 may comprise a numeric representation, such as a feature vector or a set of feature vectors.

In some examples, a data store 1052 stored in the memory 1030 may include item data 1054, which may include representations of the items offered for acquisition at the facility. The item-identification component 1050 may compare the extracted represented of the item with the "gallery" or stored representations of the known items in the item data 1054. In some instance, the item representation may include an indication of a barcode or SKU data for the item as recognized in, or extracted from, the image data 1048. The item-identification component 1050 may determine confidence level data 1056 based on the comparisons with item representation in the item data 1054. The item-identification component 1050 may determine, and assign, confidence levels indicating how likely it is that the item represented in the image data 1048 corresponds to an item from the item gallery in the item data 1054. Based on the confidence level data 1056, the item-identification component 1050 may determine an item identifier 1058 for the item in the image data 1048 (or multiple item identifiers 1058) that corresponds to an item in the item data 1054 to which the item corresponds.

In some examples, the data store 1052 may include physical-layout data 1060 that is used by the item-identification component 1050 to determine the item. The physical-layout data 1060 may include or provide a mapping of physical locations within the physical layout of devices and objects such that the location of the mobile apparatus 1000 may be utilized to determine an item stored nearby. The physical-layout data 1060 may indicate the coordinates within the facility of an inventory location, items stored at that inventory location, and so forth. In examples where the mobile apparatus 1000 has location determining sensors (e.g., GPS, RFID, proximity, etc.), the location sensor data may be used to determine where in the store the user is located. In such examples, the item-identification component 1050 may access the physical-layout data 1060 to determine if a location associated with the event is associated with a location, and confidence levels for the corresponding representations of items in the item data 1054. Continuing the example above, given the location within the facility of the event and image camera data, the physical-layout data 1060 may determine the items that may have been represented in generated images of the event.

The cart management system 1036 may further include an event-determination component 1062 to determine event-description data 1064 for the item in the image data 1048. The event-determination component 1062 may determine if the user is adding an item to the mobile apparatus 1000, removing the item from the mobile apparatus 1000, etc., based on movement of the item and/or whether the item is shown in the image data 1048. For instance, if the item is shown as being moved downward towards the interior of the mobile apparatus 1000, and the user's hand then leaves the basket without the item, it can be determined that the user added the item to the mobile apparatus 1000. Similarly, if the user's hand moves into the cart without an item, and is depicted in the image data 1048 taking an item from the cart, the event-determination component 1062 may determine that the user removed an item from the mobile apparatus 1000.

The cart management system 1036 may also include a virtual-cart management component 1066 configured to manage virtual shopping cart data 1068 for the mobile apparatus 1000. For instance, the virtual-cart management component 1066 may utilize the item data 1054, event-description data 1064, and confidence level data 1056 to add item identifier(s) 1058 to the virtual shopping cart data 1068 for items that were added to the mobile apparatus 1000, remove item identifier(s) 1058 from the virtual shopping cart data 1068 for items that were removed from the mobile apparatus 1000, and track item quantity data 1070 indicating quantities of particular items in the mobile apparatus 1000.

The cart management system 1036 may further include a user-interface component 1072 configured to present user interfaces on the display 824 based on user-interface data 1074. The user interfaces may include one or more fields to present data, and/or receive touch input (or other input via a keyboard, mouse, etc.) from a user. For instance, if the item-identification component 1050 is unable to determine an item identifier 1058 for an item shown in the image data 1048, the user-interface component 1072 may receive inquiry data 1076 generated by an inquiry component 1078 to prompt a user for feedback to help identify the item, and/or other information (e.g., if multiple items were placed in the mobile apparatus 1000). The inquiry component 1078 may be configured to generate inquiry data 1076 based on the information needed to identify the item. For instance, the inquiry data 1076 may include a prompt to request particular feedback from the user, such as to provide input (e.g., touch input, vocal/utterance input, etc.) to identify the item, input to indicate how many items were added to the mobile apparatus 1000, input to indicate whether an item was removed or added, etc. In some examples, the user-interface component 1072 may present one or more images depicting items from the item data 1054 that have the highest confidence levels as corresponding to the item in the image data 1048, but confidence levels that are not high enough to make a final decision as to the item. For instance, the user-interface component 1072 may present pictures of two different items that have high confidence levels and request that the user select or indicate the appropriate item. Additionally, or alternatively, the user-interface component 1072 may present user-interface data 1074 that prompts the user for feedback regarding whether or not the item was added to, or removed from the mobile apparatus 1000. The user-interface component 1072 may then receive response data 1080 representing a selection of an item.

In some examples, the cart management system 1036 may further include a locating component 1082 configured to determine locations of the mobile apparatus 1000 in the facility. For instance, the locating component 1082 may analyze sensor data 1044 collected by sensors of the mobile apparatus 1000 to determine a location. In some examples, the communication interface(s) 1006 may include network interfaces that configured the mobile apparatus 1000 to receive or detect wireless signals (e.g., WiFi signals, Bluetooth signals, etc.) and generate sensor data 1044 indicative of the signals. The locating component 1082 may analyze the sensor data 1044 using various techniques to identify the location of the mobile apparatus 1000, such as WiFi triangulation, received signal strength indicators (RSSI), and/or other methods for analyzing wireless signals to determine a location of the mobile apparatus 1000. In some instances, the facility may include various infrared (IR) or near-IR emitters at different locations that emit light according to frequencies, patterns, etc. that indicate the different locations in the facility. In such examples, the mobile apparatus 1000 may include a light sensor to generate the sensor data 1044 representing the IR or NIR and determine the location of the mobile apparatus 1000 in the facility. In some instances, there may be visible landmarks or markers throughout the facility that indicate a location in the facility, and the locating component 1082 may analyze image data 1048 generated by an outward facing camera 1012 to determine a location of the mobile apparatus 1000. As another example, there may be various radio frequency (RF) emitters positioned throughout the store, and the mobile apparatus 1000 may include an RF receiver to allow the locating component 1082 to perform IR beaconing to determine the location of the mobile apparatus 1000. The locating component 1082 may perform one, or any combination, of the above techniques to determine a location of the mobile apparatus 1000 in the facility and/or any other technique known in the art.

The locating component 1082 may perform various operations based on determining the location of the mobile apparatus 1000 within the facility. For instance, the locating component 1082 may cause user-interface data 1074 to be presented on the display 824 that includes a map of the facility and/or directions to an item for the user of the mobile apparatus 1000. Additionally, or alternatively, the locating component 1082 may utilize the location of the cart, the physical-layout data 1060, and/or item data 1054 and "push" user interfaces to the display 824 that indicate various location-based information, such as indications of deals for items located nearby, indications of items located nearby and on the user's shopping list, and/or other user-interface data 1074.

As further illustrated in the example of FIG. 10, the mobile apparatus 1000 may include a weight component 1084 that is configured to determine weight(s) of item(s) added to the mobile apparatus 1000 (e.g., items located within the basket 108, located within the shelf 114, and/or located on the tray 118). For example, the weight component 1084 may receive sensor data 1044 generated by sensor(s) 1028, where the sensor(s) 1028 include weight sensors described herein. The weight component 1084 may then be configured to analyze the sensor data 1044 in order to determine a weight associated with the mobile apparatus 1000. For example, the weight component 1084 may be configured to analyze the sensor data 1044 in order to determine the respective weight measured by each of the weight sensors. The weight component 1084 may then be configured to determine the weight associated with the mobile apparatus 1000 using the determined weights. For example, the weight component 1084 may determine the weight associated with the mobile apparatus 1000 by adding each of the determined weights together.

The weight component 1084 may use these weights to determine the weight of an item added to the mobile apparatus 1000. For example, the weight component 1084 may perform the processes above in order to determine a first weight associated with the mobile apparatus 1000 at a first time. The weight component 1084 may then perform the processes above in order to determine a second weight associated with the mobile apparatus 1000 at a second, later time. In some examples, the weight component 1084 receives the sensor data 1044 and/or determines the weights at the elapse of given time periods (e.g., every second, two seconds, five seconds, etc.). In some examples, the weight component 1084 receives the sensor data 1044 and/or determines the weights based on detecting that an item has been added to the mobile apparatus 1000, such as based on the output from the activity-detection component 1042, the item-identification component 1050, and/or the event-determination component 1062.

Still, in some examples, the weight component 1084 receives the sensor data 1044 and/or determines the weights based on receiving an input. For example, before adding an item to the mobile apparatus 1000, the mobile apparatus 1000 may receive an input, such as an input indicating that an item is being added to the mobile apparatus 1000 that is priced per unit weight. Based on the input, the mobile apparatus 1000 may receive sensor data 1044 and use the sensor data 1044 to determine the first weight associated with the mobile apparatus 1000. Next, after the item is added to the mobile apparatus 1000, the mobile apparatus may receive additional sensor data 1044 and use the additional sensor data 1044 to determine the second weight of the mobile apparatus 1000 after the item has been added to the mobile apparatus 1000. In any of these examples, the weight component 1084 may use the first weight and the second weight to determine the weight of the item.

For example, the weight component 1084 may determine whether the second weight is greater than the first weight. If the weight component 1084 determines that the second weight is substantially equal to the first weight, then the weight component 1084 may determine that a new item has not been added to the mobile apparatus 1000. This is because the total weight of the mobile apparatus 1000 has not by enough weight that would indicate an item has been added to the mobile apparatus 1000. However, if the weight component 1084 determines that the second weight is greater than the first weight, then the weight component 1084 may determine that a new item has been added to the mobile apparatus 1000. In some examples, the weight component 1084 may then determine the weight of the item using the weights, such as by taking the difference between the second weight and the first weight.

Additionally, or alternatively, in some examples, the weight component 1084 may use the first weight and the second weight to determine that an item has been removed from mobile apparatus 1000 (e.g., removed from the basket 108, removed from the shelf 114, and/or removed off of the tray 118). For example, the weight component 1084 may determine that the second weight is less than the first weight. Based on the determination, the weight component 1084 may determine that an item has been removed from the mobile apparatus 1000. In some examples, the weight component 1084 may then determine the weight of the item using the weights, such as by taking the difference between the first weight and the second weight. Additionally, if the mobile apparatus 1000 already knows the weights of each of the item(s) that were previously added to the mobile apparatus 1000, the mobile apparatus 1000 may determine which item was removed by matching the weight of the item removed to the weight(s) of item(s) previously added to the mobile apparatus 1000.

In some examples, the weight component 1084 may further be configured to determine a location of an item added to the mobile apparatus 1000 based on the weights. For instance, when an item is added to the mobile apparatus 1000, the weight component 1084 may be configured to determine a respective change in weight measured by each of the weight sensors. The weight component 1084 may then be configured to use the changes in weight to determine the location of the item. For example, and if the mobile apparatus 1000 includes a shopping cart, the weight component 1000 may determine that the item was placed within the back of the basket (e.g., placed close to the handlebar) when the weight sensors associated with the back wheel apparatuses detected a greater change in weight than the weight sensors associated with the front wheel apparatuses. For another example, and if the mobile apparatus 1000 again includes a shopping cart, the weight component 1000 may determine that the item was placed at a front-right location within the basket when the weight sensor(s) associated with the front-right wheel apparatus detected a greater change in weight than the weight sensors associated with other wheel apparatuses.

While the examples above describe the weight component 1084 as receiving the sensor data 1044 from the weight sensors and then using the sensor data 1044 to determine the weights associated with the mobile apparatus 1000, in other examples, the weight component 1084 may receive, from each wheel apparatus, data representing the respective weight measured by each wheel apparatus. In such examples, the weight component 1084 may receive such data when the wheel apparatuses include one or more components, such as the weight component 944, that already analyze the sensor data 1044 generated by the weight sensors in order to determine the weights. Additionally, in such examples, the weight component 1084 may then use the weights to determine the weight associated with the mobile apparatus 1000. For example, the weight component 1084 may determine the weight associated with the mobile apparatus 1000 by adding each of the weights together.

In some examples, the weight component 1084 (and/or another component) may perform one or more processes using the weights associated with the items. For a first example, if an item is priced per unit weight, then the weight component 1084 (and/or another component) may determine a price of the item using the weight and the price per unit weight. For instance, the weight component 1084 may determine the price as the weight of the item multiplied by the price per unit weight. In such examples, the item data 1054 may represent the price per unit weight of the item. For instance, if the price per unit weight of the item is $1.00 for every pound, and the measured weight of the item is 10 pounds, then the weight component 1084 may determine that the price of the item is $10.00.

For a second example, the weight component 1084 (and/or another component, such as the item-identification component 1050) may verify an item that has been added to or removed from the mobile apparatus 1000. For instance, and as discussed above, the item-identification component 1050 may determine an initial identity of an item, such as by analyzing image data generated by one or more of the capture assemblies 1008, using one or more of the processes described herein. The weight component 1084 may then determine a weight of an item added to the mobile apparatus 102. Additionally, the weight component 1084 (and/or another component, such as the item-identification component 1050) may use the weight to verify the initial identity of the item. For instance, the item data 1054 may represent the expected weights of items, such as the weight of the item. The weight component 1084 (and/or the other component) may then compare the weight of the first item as represented by the item data 1054 to the weight of the item as measured by the weight sensor(s). The weight component 1084 (and/or the other component) may then verify the identity of the item when the measured weight is within a threshold percentage to the weight represented by the item data 1054, or the weight component 1084 (and/or the other component) may not verify the identity of the item when the measured weight is outside of the threshold weight. The threshold may include, but is not limited to, 0.1%, 0.5%, 1%, and/or any other percentage. When performing such processes, the weight component 1084 (and/or the other component) are able to verify the identities of items add to the mobile apparatus 1000 and/or items removed from the mobile apparatus 1000.

For a third example, the weight component 1084 (and/or another component) may determine a number of items added to the mobile apparatus 1000. For instance, the item-identification component 1050 may again determine an identity of item(s) added to the mobile apparatus 1000 while the weight component 1084 determines the weight of the item(s). The weight component 1084 (and/or the other component) may then determine the number of the item(s) added to the mobile apparatus 1000. For instance, the weight component 1084 (and/or the other component) may use the item data 1054 to determine the weight per unit item associated with the identified item(s). The weight component 1084 (and/or the other component) may then determine the number of items using the measured weight and the weight per unit item. In some instances, the weight component 1084 (and/or the other component) may determine the number of items by dividing the measured weight by the weight per unit item. For instance, if the weight per unit item is 1 pound per unit item and the measured weight is 10 pounds, then the weight component 1084 (and/or the other component) may determine that the number of items is 10 items.

In some examples, the virtual-cart management component 1066 may be configured to generate item weight data 1086 representing the weights of the items, which the virtual-cart management component 1066 may store as part of the virtual shopping cart data 1068. Additionally, in some examples, the item data 1054 may represent the prices per unit weight of certain items within the facility. In such examples, the virtual-cart management component 1066 may be configured to use the item weight data 1086 and the item data 1054 in order to determine the price of such an item that is added to the mobile apparatus 1000. The mobile apparatus 1000 may then be configured to provide the price of the item to the user, such as using the display 824.

As described above, in some examples, the mobile apparatus 1000 may represent, and/or include, the mobile apparatus 102. However, in other examples, the mobile apparatus 1000 may include any apparatus that includes at least one wheel apparatus for mobility. For example, the mobile apparatus 1000 may include any apparatus that includes one wheel apparatus, two wheel apparatuses, three wheel apparatuses, four wheel apparatuses, five wheel apparatuses, and/or the like for mobility. For example, the mobile apparatus 1000 may include any apparatus that includes at least one frame 1088 and at least one compartment 1090. The compartment(s) 1090 may include any component of the mobile apparatus 1000 that is configured to receive objects, such as user(s), item(s), and/or the like. For example, the compartment(s) 1090 may include, but are not limited to, a basket, a shelf, a tray, a flat surface, a seat, and/or the like that is configured to receive objects.

Figure 11:
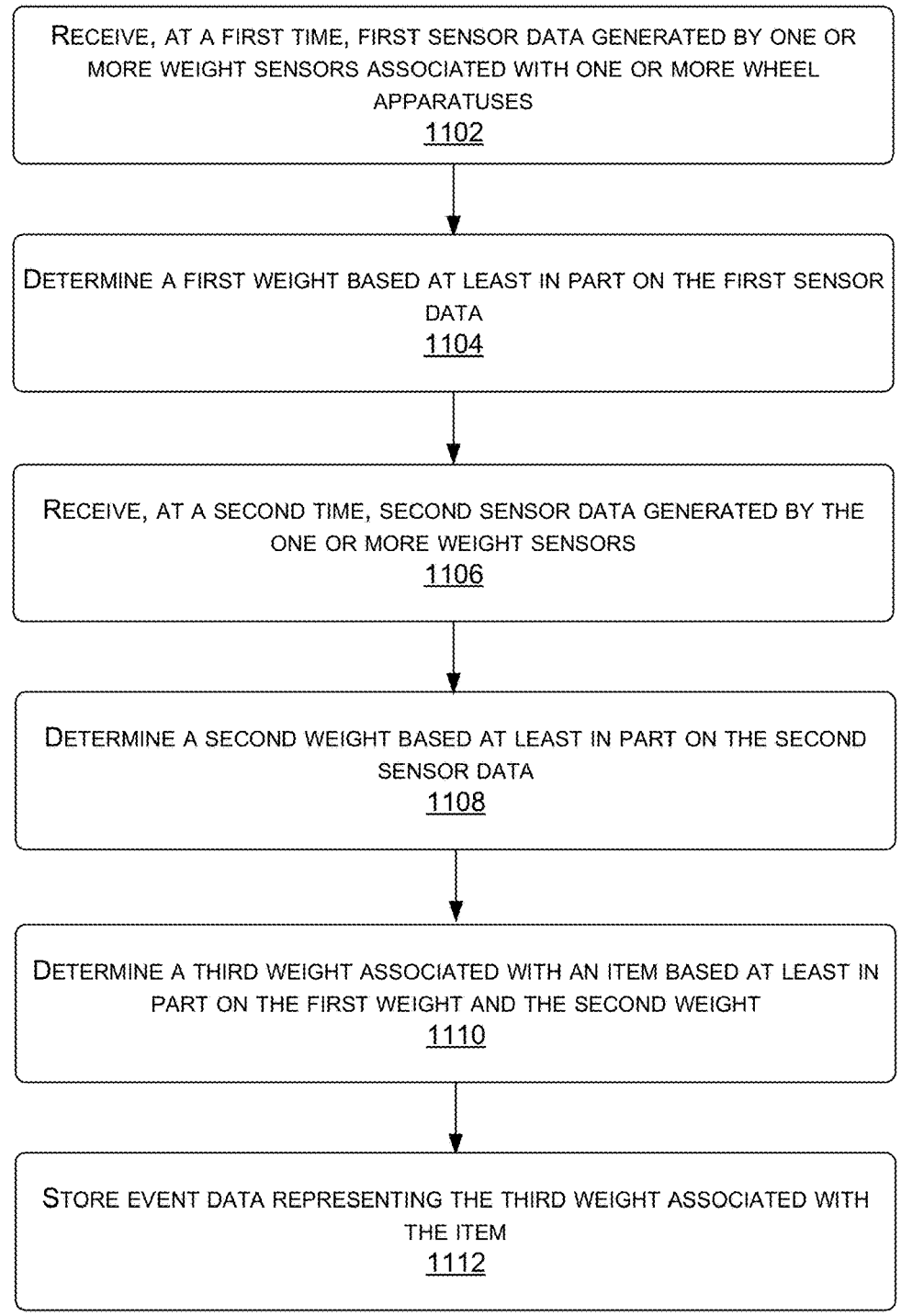
FIG. 11 illustrates a flow diagram of an example process for determining a weight of an item added to a mobile apparatus, in accordance with examples of the present disclosure.

FIG. 11 illustrates a process for determining a weight of an item using weight sensor(s). The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 11 illustrates a flow diagram of an example process 1100 for determining a weight of an item added to the mobile apparatus 1000, in accordance with examples of the present disclosure. At 1102, the process 1100 may include receiving, at a first time, first sensor data generated by one or more weight sensors associated with one or more wheel apparatuses. For instance, the mobile apparatus 1000 may receive the first sensor data generated by the weight sensor(s) associated with the wheel apparatus(es). In some examples, the weight sensor(s) may be included within the wheel(s) of the wheel apparatus(es). For instance, the weight sensor(s) may be disposed within the rim(s) of the wheel(s). In some examples, the mobile apparatus 1000 receives the sensor data continuously. In some examples, the mobile apparatus 1000 receives the sensor data at the elapse of given time periods. Still, in some examples, the mobile apparatus 1000 receives the sensor data based on an event being detected by the mobile apparatus 1000. The event may include, but is not limited to, the mobile apparatus 1000 stopping, the mobile apparatus 1000 beginning to move, an item being added to the mobile apparatus 1000, an item being removed from the mobile apparatus 1000, a user rummaging through the item(s) added to the mobile apparatus 1000, the mobile apparatus 1000 receiving an input associated with an item that is priced per unit weight, and/or the like.

At 1104, the process 1100 may include determining a first weight based at least in part on the first sensor data. For instance, the mobile apparatus 1000 may analyze the first sensor data in order to determine the first weight. In some examples, such as when the mobile apparatus 1000 includes multiple wheel apparatuses with multiple weight sensors (and/or multiple loadcells), the mobile apparatus 1000 may analyze the first sensor data to determine a respective weight measured by each weight sensor (and/or each loadcell). The mobile apparatus 1000 may then determine the first weight using the respective weights. For example, the mobile apparatus 1000 may determine the first weight by adding all of the respective weights together.

At 1106, the process 1100 may include receiving, at a second time, second sensor data generated by the one or more weight sensors. For instance, the mobile apparatus 1000 may receive the second sensor data generated by the weight sensor(s) associated with the wheel apparatus(es). In some examples, the mobile apparatus 1000 receives the second sensor data directly after receiving the first sensor data (e.g., when the mobile apparatus 1000 continuously receives the sensor data). In some examples, the mobile apparatus 1000 receives the second sensor data at the elapse of a given time period after receiving the first sensor data. Still, in some examples, the mobile apparatus 1000 receives the second sensor data based on an additional event being detected by the mobile apparatus 1000.

At 1108, the process 1100 may include determining a second weight based at least in part on the second sensor data. For instance, the mobile apparatus 1000 may analyze the second sensor data in order to determine the second weight. In some examples, such as when the mobile apparatus 1000 includes multiple wheel apparatuses with multiple weight sensors (and/or multiple loadcells), the mobile apparatus 1000 may analyze the second sensor data to determine a respective weight measured by each weight sensor (and/or each loadcell). The mobile apparatus 1000 may then determine the second weight using the respective weights. For example, the mobile apparatus 1000 may determine the second weight by adding all of the respective weights together.

At 1110, the process 1100 may include determining a third weight associated with an item based at least in part on the first weight and the second weight. For instance, the mobile apparatus 1000 may determine the third weight using the first weight and the second weight. In some examples, the mobile apparatus 1000 determines the third weight as a difference between the second weight and the first weight. The mobile apparatus 1000 may then identify the item associated with the third weight. In some examples, the mobile apparatus 1000 identifies the item using one or more additional sensors, such as imaging devices of the mobile apparatus 1000. In some examples, such as when the item is priced per unit weight, the mobile apparatus 1000 may determine a price of the item using the third weight. For example, the mobile apparatus 1000 may determine the price by multiplying the third weight by the price per unit weight.

In some examples, the mobile apparatus 1000 may then perform one or more processes using the third weight associated with the item. For a first example, the mobile apparatus 1000 may detect an event, such as the item being added to or removed from the mobile apparatus 1000, using the third weight. For a second example, the mobile apparatus 1000 may determine, using the third weight, a price of the item that is based on a price per unit weight associated with the item. For a third example, the mobile apparatus 1000 may verify an identity of the item that the mobile apparatus 1000 determined using one or more other techniques, such as analyzing image data. Still, for a fourth example, the mobile apparatus 1000 may determine a number of units of the item that were added to or removed from the mobile apparatus 1000 using the third weight and a weight per unit of the item.

At 1112, the process 1100 may include storing event data representing the third weight associated with the item. For instance, the mobile apparatus 1000 may generate event data (e.g., virtual shopping cart data) representing at least the identifier associated with the item and the third weight of the item. In some examples, the event data may further represent the price of the item, such as when the item is priced per unit weight, or the number of units associated with the weight. Additionally, the mobile apparatus 1000 may provide information to a user of the mobile apparatus 1000. For example, the mobile apparatus 1000 may display the identifier associated with the item, the third weight of the item, the price of the item, and/or any other type of information to the user.

Figure 12:
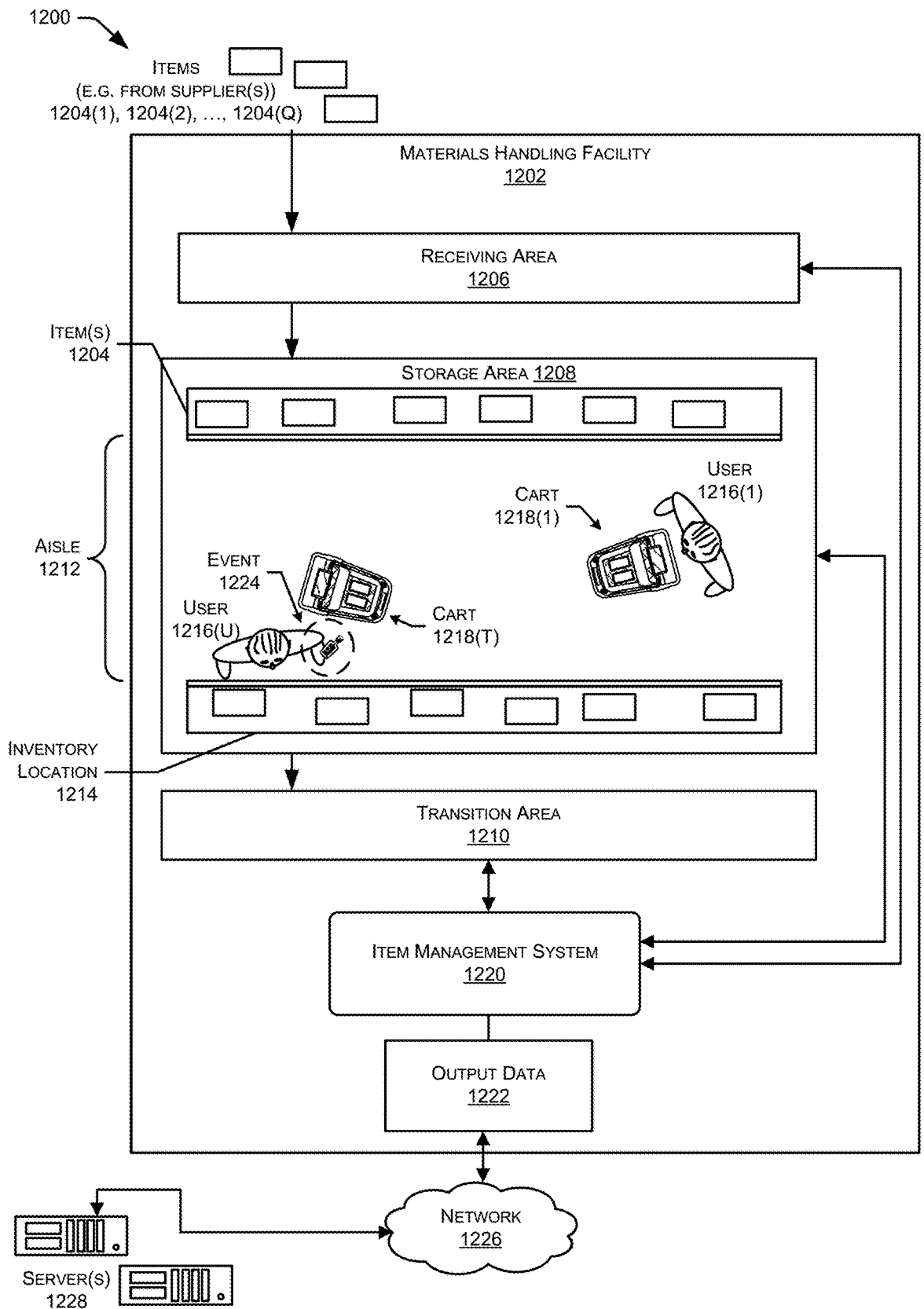
FIG. 12 is an example process for using capacitive sensor(s) of an inventory location to detect item events, in accordance with examples of the present disclosure.

FIG. 12 is a block diagram 1200 of an example materials handling facility 1202 (also referred to the "facility 1202") that includes carts and an item management system configured to generate output regarding events occurring in the cart using sensor data. However, the following description is merely one illustrative example of an industry and environment in which the techniques described herein may be utilized.

An example of the facility 1202 configured to store and manage inventory items is illustrated in FIG. 12. The facility 1202 comprises one or more physical structures or areas within which one or more items 1204(1), 1204(2), . . . , 1204(Q) (generally denoted as 1204) may be held. As used in this disclosure, letters in parenthesis such as "(Q)" indicate an integer result. The items 1204 comprise physical goods, such as books, pharmaceuticals, repair parts, electronic gear, groceries, and so forth.

The facility 1202 may include one or more areas designated for different functions with regard to inventory handling. In this illustration, the facility 1202 includes a receiving area 1206, a storage area 1208, and a transition area 1210. The receiving area 1206 may be configured to accept items 1204, such as from suppliers, for intake into the facility 1202. For example, the receiving area 1206 may include a loading dock at which trucks or other freight conveyances unload the items 1204.

The storage area 1208 is configured to store the items 1204. The storage area 1208 may be arranged in various physical configurations. In one example, the storage area 1208 may include one or more aisles 1212. The aisles 1212 may be configured with, or defined by, inventory locations 1214 on one or both sides of the aisle 1212. The inventory locations 1214 may include one or more of shelves, racks, cases, cabinets, bins, floor locations, or other suitable storage mechanisms for holding or storing the items 1204. The inventory locations 1214 may be affixed to the floor or another portion of the facility's structure, or may be movable such that the arrangements of aisles 1212 may be reconfigurable. In some examples, the inventory locations 1214 may be configured to move independently of an outside operator. For example, the inventory locations 1214 may comprise a rack with a power source and a motor, operable by a computing device to allow the rack to move from one location within the facility 1202 to another.

One or more users 1216(1), . . . , 1216(U), carts 1218(1), . . . , 1218(T) (generally denoted as 1218) or other material handling apparatus may move within the facility 1202. For example, the users 1216 may move about within the facility 1202 to pick or place the items 1204 in various inventory locations 1214, placing them on the carts 1218 for ease of transport. An individual cart 1218 is configured to carry or otherwise transport one or more items 1204. For example, a cart 1218 may include a basket, a cart, a bag, and so forth. In other examples, other agencies such as robots, forklifts, cranes, aerial drones, and so forth, may move about the facility 1202 picking, placing, or otherwise moving the items 1204.

One or more sensors may be configured to acquire information in the facility 1202. The sensors in the facility 1202 may include sensors fixed in the environment (e.g., ceiling-mounted cameras) or otherwise, such as sensors in the possession of users (e.g., mobile phones, tablets, etc.) or sensors mounted on the carts 1218. The sensors may include, but are not limited to, cameras, weight sensors (e.g., in the bottom of the carts 1218), radio frequency (RF) receivers, temperature sensors, humidity sensors, vibration sensors, and so forth. The sensors may be, in some examples, in or on the cart 1218 or another location in the facility 1202. In one example, the bottom of a basket of the carts 1218 may include weight sensors configured to determine a weight of the items 1204 placed thereupon.

During operation of the facility 1202, the sensors may be configured to provide information suitable for identifying the movement of items 1204 or other occurrences within the cart 1218. For example, a series of images acquired by a camera may indicate removal of an item 1204 from a particular cart 1218 by one of the users 1216 and/or placement of the item 1204 on or at least partially within one of the carts 1218.

While the storage area 1208 is depicted as having one or more aisles 1212, inventory locations 1214 storing the items 1204, sensors, and so forth, it is understood that the receiving area 1206, the transition area 1210, or other areas of the facility 1202 may be similarly equipped. Furthermore, the arrangement of the various areas within the facility 1202 is depicted functionally rather than schematically. For example, multiple different receiving areas 1206, storage areas 1208, and transition areas 1210 may be interspersed rather than segregated in the facility 1202.

The carts 1218 and/or the inventory location 1214 may include, or be coupled to, an item management system 1220. The item management system 1220 is configured to identify interactions with and between users 1216, carts 1218, and/or the inventory location 1214, in one or more of the receiving area 1206, the storage area 1208, or the transition area 1210. These interactions may include one or more events 1224. For example, events 1224 may include placing of an item 1204 in a cart 1218, returning of an item 1204 from the cart 1218 to an inventory location 1214, placing an item 1204 on the inventory location 1214, removing an item 1204 from the inventory location 1214, and/or any of the other events described herein. Other events 1224 involving users 1216 may include the user 1216 providing authentication information in the facility 1202, using a computing device at the facility 1202 to authenticate identity to the item management system 1220, and so forth.

By determining the occurrence of one or more of the events 1224, the item management system 1220 may generate output data 1222. The output data 1222 comprises information about the event 1224. For example, where the event 1224 comprises an item 1204 being removed from, or placed in, a cart 1218, the output data 1222 may comprise an item identifier indicative of the particular item 1204 that was removed from, or placed in, the cart 1218, a quantity of the item 1204, a user identifier of a user that removed the item 1204, and/or other output data 1222.

The item management system 1220 may use one or more automated systems to generate the output data 1222. For example, an artificial neural network, one or more classifiers, or other automated machine learning techniques may be used to process the sensor data and/or image data from the one or more sensors to generate output data 1222. The automated systems may operate using probabilistic or non-probabilistic techniques. For example, the automated systems may use a Bayesian network. In another example, the automated systems may use support vector machines to generate the output data 1222 or the tentative results. The automated systems may generate confidence level data that provides information indicative of the accuracy or confidence that the output data 1222 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 125%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 1204 may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 1216 may pick an item 1204(1) such as a perfume bottle that is generally cubical in shape from the inventory location 1214. Other items 1204 at nearby inventory locations 1214 may be predominately spherical. Based on the difference in shape (cube vs. sphere) from the adjacent items, and the correspondence in shape with the previously stored image of the perfume bottle item 1204(1) (cubical and cubical), the confidence level that the user 1216 has picked up the perfume bottle item 1204(1) is high.

In some situations, the automated techniques may be unable to generate output data 1222 with a confidence level above a threshold result. For example, the automated techniques may be unable to distinguish which item 1204 in large a group of items a user 1216 has picked up from the inventory location 1214 and placed in the cart 1218. In other situations, it may be desirable to provide human confirmation of the event 1224 or of the accuracy of the output data 1222. For example, some items 1204 may be deemed age restricted such that they are to be handled only by users 1216 above a minimum age threshold.

In instances where human confirmation is desired, sensor data associated with an event 1224 may be processed to generate inquiry data. The inquiry data may include a subset of the sensor data associated with the event 1224. The inquiry data may also include one or more of one or more tentative results as determined by the automated techniques, or supplemental data. The subset of the sensor data may be determined using information about the one or more sensors. The subset of the sensor data may include images that may show the item 1204 being placed in, or removed from, the cart 1218. The subset of the sensor data may also omit images from other cameras that did not have that item 1204 in the field of view. The field of view may comprise a portion of the scene in the cart 1218 that the camera is able to generate sensor/image data about.

Continuing the example, the subset of the sensor data may comprise a video clip acquired by one or more cameras having a field of view that includes the item 1204. The tentative results may comprise the "best guess" as to which items 1204 may have been involved in the event 1224. For example, the tentative results may comprise results determined by the automated system that have a confidence level above a minimum threshold.

The facility 1202 may be configured to receive different kinds of items 1204 from various suppliers and to store them until a customer orders or retrieves one or more of the items 1204. A general flow of items 1204 through the facility 1202 is indicated by the arrows of FIG. 12. Specifically, as illustrated in this example, items 1204 may be received from one or more suppliers, such as manufacturers, distributors, wholesalers, and so forth, at the receiving area 1206. In various examples, the items 1204 may include merchandise, commodities, perishables, or any suitable type of item 1204, depending on the nature of the enterprise that operates the facility 1202. The receiving of the items 1204 may comprise one or more events 1224 for which the item management system 1220 may generate output data 1222.

Upon being received from a supplier at receiving area 1206, the items 1204 may be prepared for storage. For example, items 1204 may be unpacked or otherwise rearranged. An inventory management system of the facility 1202 may include one or more software applications executing on a computer system to provide inventory management functions based on the events 1224 associated with the unpacking or rearrangement. These inventory management functions may include maintaining information indicative of the type, quantity, condition, cost, location, weight, or any other suitable parameters with respect to the items 1204. The items 1204 may be stocked, managed, or dispensed in terms of countable, individual units or multiples, such as packages, cartons, crates, pallets, or other suitable aggregations. Alternatively, some items 1204, such as bulk products, commodities, and so forth, may be stored in continuous or arbitrarily divisible amounts that may not be inherently organized into countable units. Such items 1204 may be managed in terms of measurable quantity such as units of length, area, volume, weight, time, duration, or other dimensional properties characterized by units of measurement. Generally speaking, a quantity of an item 1204 may refer to either a countable number of individual or aggregate units of an item 1204 or a measurable amount of an item 1204, as appropriate.

After arriving through the receiving area 1206, items 1204 may be stored within the storage area 1208. In some examples, like items 1204 may be stored or displayed together in the inventory locations 1214 such as in bins, on shelves, hanging from pegboards, and so forth. In this example, all items 1204 of a given kind are stored in one inventory location 1214. In other examples, like items 1204 may be stored in different inventory locations 1214. For example, to optimize retrieval of certain items 1204 having frequent turnover within a large physical facility 1202, those items 1204 may be stored in several different inventory locations 1214 to reduce congestion that might occur at a single inventory location 1214.

When a customer order specifying one or more items 1204 is received, or as a user 1216 progresses through the facility 1202, the corresponding items 1204 may be selected or "picked" from the inventory locations 1214 containing those items 1204. In various examples, item picking may range from manual to completely automated picking. For example, in one example, a user 1216 may have a list of items 1204 they desire and may progress through the facility 1202 picking items 1204 from inventory locations 1214 within the storage area 1208, and placing those items 1204 into a cart 1218. In other examples, employees of the facility 1202 may pick items 1204 using written or electronic pick lists derived from customer orders. These picked items 1204 may be placed into the cart 1218 as the employee progresses through the facility 1202. Picking may comprise one or more events 1224, such as the user 1216 in moving to the inventory location 1214, retrieval of the item 1204 from the inventory location 1214, and so forth.

After items 1204 have been picked, they may be processed at a transition area 1210. The transition area 1210 may be any designated area within the facility 1202 where items 1204 are transitioned from one location to another or from one entity to another. For example, the transition area 1210 may be a packing station within the facility 1202. When the item 1204 arrives at the transition area 1210, the items 1204 may be transitioned from the storage area 1208 to the packing station. Information about the transition may be maintained by the item management system 1220 using the output data 1222 associated with those events 1224.

In another example, if the items 1204 are departing the facility 1202 a list of the items 1204 may be used by the item management system 1220 to transition responsibility for, or custody of, the items 1204 from the facility 1202 to another entity. For example, a carrier may accept the items 1204 for transport with that carrier accepting responsibility for the items 1204 indicated in the list. In another example, a customer may purchase or rent the items 1204 and remove the items 1204 from the facility 1202.

The item management system 1220 may access or generate sensor data about the items 1204, the users 1216, the carts 1218, and so forth. The sensor data may be acquired by one or more of the sensors, data provided by other systems, and so forth. For example, the sensors may include cameras configured to acquire image data of items 1204 placed in the carts 1218. The image data may comprise still images, video, or a combination thereof. The image data may be processed by the item management system 1220 to determine an item identifier for the items 1204, a listing of items in the cart 1218 for a user 1216, and so forth. As used herein, the identity of the user of a cart 1218 may represent a unique identifier of the user (e.g., name, number associated with user, username, etc.), an identifier that distinguishes the user amongst other users being identified with the environment, or the like.

The item management system 1220, or systems coupled thereto, may be configured to identify the user 1216. In one example, this determination may comprise comparing sensor data with previously stored identity data. For example, the user 1216 may be identified by showing their face to a facial recognition system, by presenting a token carrying authentication credentials, providing a fingerprint, scanning a barcode or other type of unique identifier upon entering the facility, and so forth. Identity of the user 1216 may be determined before, during, or after entry to the facility 1202 and/or interaction with a cart 1218. Determination of the user's 1216 identity may comprise comparing sensor data associated with the user 1216 in the facility 1202 and/or with the cart 1218 to previously stored user data. In some examples, the output data 1222 may be transmitted over a network 1226 to server(s) 1228.

Separate instances of these programs can be executed on or distributed across any number of separate computer systems. Thus, although certain steps have been described as being performed by certain devices, software programs, processes, or entities, this need not be the case, and a variety of alternative examples will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

The invention claimed is:

1. A mobile cart comprising:
   an upper frame;
   a basket coupled to the upper frame, the basket configured to hold at least an item;
   a wheel frame;
   a substantially vertical member extending substantially downward from the upper frame and to a top of the wheel frame;
   a first wheel apparatus coupled to a bottom of the wheel frame, the first wheel apparatus comprising a first weight sensor;
   a second wheel apparatus coupled to the bottom of the wheel frame, the second wheel apparatus comprising a second weight sensor;
   a third wheel apparatus coupled to the bottom of the wheel frame, the third wheel apparatus comprising a third weight sensor;
   a fourth wheel apparatus coupled to the bottom of the wheel frame, the fourth wheel apparatus comprising a fourth weight sensor, wherein:
     the first weight sensor further comprises a first loadcell and a second loadcell located within a first circular component of the first wheel apparatus;
     the second weight sensor comprises a third loadcell and a fourth loadcell located within a second circular component of the second wheel apparatus;
     the third weight sensor comprises a fifth loadcell and a sixth loadcell located within a third circular component of the third wheel apparatus; and
     the fourth weight sensor comprises a seventh loadcell and an eighth loadcell within a fourth circular component of the fourth wheel apparatus;
   one or more processors; and
   one or more computer-readable media storing instructions that, when executed by the one or more processors, cause the one or more processors to perform operations comprising:
     receiving first sensor data from the first weight sensor;
     receiving second sensor data from the second weight sensor;
     receiving third sensor data from the third weight sensor;
     receiving fourth sensor data from the fourth weight sensor;
     determining a weight of the item based at least in part on the first sensor data, the second sensor data, the third sensor data, and the fourth sensor data; and
     generating item data representing at least an identifier of the item and the weight of the item.

2. The mobile cart as recited in claim 1, wherein:
   the first wheel apparatus further comprises:
     a first hub;
     a first circular component disposed around the first hub, wherein the first weight sensor is disposed within the first circular component; and
     a first caster that attaches the first wheel apparatus to the bottom of the wheel frame;
   the second wheel apparatus further comprises:
     a second hub;
     a second circular component disposed around the second hub, wherein the second weight sensor is located within the second circular component; and
     a second caster that attaches the second wheel apparatus to the bottom of the wheel frame;
   the third wheel apparatus further comprises:
     a third hub;
     a third circular component disposed around the third hub, wherein the third weight sensor is disposed within the third circular component; and
     a third caster that attaches the third wheel apparatus to the bottom of the wheel frame; and the fourth wheel apparatus further comprises:
a fourth hub;
a fourth circular component disposed around the fourth hub, wherein the fourth weight sensor is disposed within the fourth circular component; and
a fourth caster that attaches the fourth wheel apparatus to the bottom of the wheel frame.

3. A mobile apparatus comprising:
a frame;
a compartment coupled to the frame; and
a wheel coupled to the frame, the wheel comprising:
a circular component;
a weight sensor disposed within the circular component;
a communication interface for sending sensor data generated by the weight sensor; and
a hub disposed within the circular component, and wherein the weight sensor includes one or more loadcells couples to the hub.

4. The mobile apparatus as recited in claim 3, wherein the wheel is a first wheel, the circular component is a first circular component, the weight sensor is a first weight sensor, the communication interface is a first communication interface, and the sensor data is first sensor data, and wherein the mobile apparatus further comprises a second wheel coupled to the frame, the second wheel comprising:
a second circular component;
a second weight sensor disposed within the second circular component; and
a second communication interface for sending second sensor data generated by the second weight sensor.

5. The mobile apparatus as recited in claim 3, wherein the wheel is a first wheel, the circular component is a first circular component, the weight sensor is a first weight sensor, the communication interface is a first communication interface, and the sensor data is first sensor data, and wherein the mobile apparatus further comprises:
a second wheel coupled to the frame, the second wheel comprising:
a second circular component;
a second weight sensor disposed within the second circular component; and
a second communication interface for sending second sensor data generated by the second weight sensor; and
a third wheel coupled to the frame, the third wheel comprising:
a third circular component;
a third weight sensor disposed within the third circular component; and
a third communication interface for sending third sensor data generated by the third weight sensor.

6. The mobile apparatus as recited in claim 3, wherein:
the frame comprises:
an upper frame; and
a wheel frame;
the compartment comprises a basket coupled to the upper frame;
the wheel is a first wheel coupled to the wheel frame;
the weight sensor is a first weight sensor; and
the mobile apparatus further comprises:
a second wheel coupled to the wheel frame, the second wheel comprising a second weight sensor;
a third wheel coupled to the wheel frame, the third wheel comprising a third weight sensor; and
a fourth wheel coupled to the wheel frame, the fourth wheel comprising a fourth wheel sensor.

7. The mobile apparatus as recited in claim 3, wherein:
the circular component comprises:
a rim; and
a tire disposed around the rim;
the weight sensor is disposed within the rim; and
the mobile apparatus further comprises a caster that couples the wheel the frame.

8. The mobile apparatus as recited in claim 3, wherein the weight sensor is disposed within the wheel such that the weight sensor remains perpendicular with respect to a ground plane when the circular component rotates.

9. The mobile apparatus as recited in claim 3, wherein the wheel further comprises at least one of:
a locking mechanism;
one or more batteries; or
a generator.

10. The mobile apparatus as recited in claim 3, wherein the sensor data is first sensor data, and wherein the mobile apparatus further comprises:
one or more processors; and
one or more computer-readable media storing instructions that, when executed by the one or more processors, cause the one or more processors to perform operations comprising:
receiving, at a first time, the first sensor data generated by the weight sensor;
determining a first weight based at least in part on the first sensor data;
receiving, at a second time, second sensor data generated by the weight sensor;
determining a second weight based at least in part on the second sensor data; and
determining a weight of an item based at least in part on the first weight and the second weight.

11. The mobile apparatus as recited in claim 3, wherein the wheel is a first wheel, the circular component is a first circular component, the weight sensor is a first weight sensor, the communication interface is a first communication interface, and the sensor data is first sensor data, and wherein the mobile apparatus further comprises:
a second wheel coupled to the frame, the second wheel comprising:
a second circular component;
a second weight sensor disposed within the second circular component; and
a second communication interface,
one or more processors; and
one or more computer-readable media storing instructions that, when executed by the one or more processors, cause the one or more processors to perform operations comprising:
receiving the first sensor data generated by the first weight sensor;
receiving second sensor data generated by the second weight sensor; and
determining a weight of an item based at least in part on the first sensor data and the second sensor data.

12. The mobile apparatus as recited in claim 3, further comprising:
an imaging device,
one or more processors; and
one or more computer-readable media storing instructions that, when executed by the one or more processors, cause the one or more processors to perform operations comprising:

receiving image data generated by the imaging device;
determining an identity of an item based at least in part on the image data;
receiving the sensor data generated by the weight sensor;
determining a weight of the item based at least in part on the sensor data;
determining a price per unit weight associated with the item;
determining a price of the item based at least in part on the weight and the price per unit weight; and
generating item data representing at least the identity of the item, the weight of the item, and the price.

13. The mobile apparatus as recited in claim 3, further comprising:
an imaging device,
one or more processors; and
one or more computer-readable media storing instructions that, when executed by the one or more processors, cause the one or more processors to perform operations comprising:
receiving image data generated by the imaging device;
determining an identity of an item based at least in part on the image data;
receiving the sensor data generated by the weight sensor;
determining a first weight based at least in part on the sensor data;
determining a second weight associated with the item; and
verifying the identity of the item based at least in part on the first weight and the second weight.

14. The mobile apparatus as recited in claim 3, further comprising:
an imaging device,
one or more processors; and
one or more computer-readable media storing instructions that, when executed by the one or more processors, cause the one or more processors to perform operations comprising:
receiving image data generated by the imaging device;
determining an identity of an item based at least in part on the image data;
receiving the sensor data generated by the weight sensor;
determining a first weight associated with one or more items based at least in part on the sensor data;
determining a second weight associated with a unit of the item;
determining a number of the item based at least in part on the first weight and the second weight; and
generating item data representing at least the identity of the item and the number of the item.

15. A wheel comprising:
a hub;
a circular component disposed around the hub;
a weight sensor disposed within the circular component, the weight sensor configured to generate sensor data representing weight and wherein the weight sensor comprises a first loadcell coupled to a first side of the hub and a second loadcell coupled to a second side of the hub; and
a communication interface, the communication interface to send sensor data to one or more computing devices associated with a mobile apparatus.

16. The wheel as recited in claim 15, wherein the communication interface comprises at least one of:
a wired interface that connects to the one or more computing devices; or
a wireless interface that communicates with the one or more computing devices using a wireless network.

17. The wheel as recited in claim 15, further comprising at least one of:
a locking mechanism;
one or more batteries disposed within the circular component; or
a generator disposed within the circular component.

18. The mobile cart as recited in claim 1, wherein the first circular component of the first wheel apparatus further comprises:
a first side, wherein the first loadcell is coupled to the first side; and
a second side, wherein the second loadcell is coupled to the second side.

19. The mobile apparatus as recited in claim 3, wherein the hub comprises an inner hub and an outer hub, wherein at least one or more loadcells are coupled between the inner hub and the outer hub.

20. The wheel as recited in claim 15, wherein the hub comprises an inner hub and an outer hub, and wherein at least one or more loadcells care coupled between the inner hub and the outer hub.

* * * * *